United States Patent
Taghavi Nasrabadi et al.

(10) Patent No.: US 11,418,769 B1
(45) Date of Patent: Aug. 16, 2022

(54) VIEWPORT ADAPTIVE VOLUMETRIC CONTENT STREAMING AND/OR RENDERING

(71) Applicant: Apple Inc., Cupertino, CA (US)

(72) Inventors: Afshin Taghavi Nasrabadi, Santa Clara, CA (US); Maneli Noorkami, Sunnyvale, CA (US); Ranjit Desai, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/222,872

(22) Filed: Apr. 5, 2021

Related U.S. Application Data

(60) Provisional application No. 63/083,825, filed on Sep. 25, 2020.

(51) Int. Cl.
*H04N 13/117* (2018.01)
*G06T 15/08* (2011.01)
*H04N 13/161* (2018.01)
*H04N 13/178* (2018.01)

(52) U.S. Cl.
CPC ........... *H04N 13/117* (2018.05); *G06T 15/08* (2013.01); *H04N 13/161* (2018.05); *H04N 13/178* (2018.05); *G06T 2207/10028* (2013.01)

(58) Field of Classification Search
None
See application file for complete search history.

(56) References Cited

U.S. PATENT DOCUMENTS

2020/0381022 A1* 12/2020 Ilola ................. H04N 19/70
2021/0337243 A1* 10/2021 Oh .................... H04N 21/81

* cited by examiner

*Primary Examiner* — Christopher Braniff
(74) *Attorney, Agent, or Firm* — Robert C. Kowert; Kowert, Hood, Munyon, Rankin & Goetzel, P.C.

(57) ABSTRACT

A system comprises an encoder configured to compress and encode data for three-dimensional volumetric content. The encoder also is configured to segment the three-dimensional volumetric content based on viewing areas, wherein different ones of the viewing areas correspond to visible portions of the volumetric content. The system may provide metadata to a client device to support viewport adaptive rendering of the three-dimensional volumetric content or may adaptively stream portions of the three-dimensional volumetric content to a rending device based on viewing areas of the three-dimensional volumetric content that are to be rendered at the rendering device.

20 Claims, 22 Drawing Sheets

VIEWPORT ADAPTIVE VOLUMETRIC CONTENT STREAMING AND/OR RENDERING

PRIORITY CLAIM

This application claims benefit of priority to U.S. Provisional Application Ser. No. 63/083,825, entitled "Viewport Adaptive Volumetric Content Streaming and/or Rendering", filed Sep. 25, 2020, and which is incorporated herein by reference in its entirety.

BACKGROUND

Technical Field

This disclosure relates generally to compression and decompression of three-dimensional volumetric content, such as point clouds, immersive video, etc. and generating metadata that enables viewport adaptive streaming and/or rendering of portions of the three-dimensional volumetric content.

Description of the Related Art

Various types of sensors, such as light detection and ranging (LIDAR) systems, 3-D-cameras, 3-D scanners, etc. may capture data indicating positions of points in three dimensional space, for example positions in the X, Y, and Z planes. Also, such systems may further capture attribute information in addition to spatial information for the respective points, such as color information (e.g. RGB values), texture information, intensity attributes, reflectivity attributes, motion related attributes, modality attributes, or various other attributes. In some circumstances, additional attributes may be assigned to the respective points, such as a time-stamp when the point was captured. Points captured by such sensors may make up a "point cloud" comprising a set of points each having associated spatial information and one or more associated attributes. In some circumstances, a point cloud may include thousands of points, hundreds of thousands of points, millions of points, or even more points. Also, in some circumstances, point clouds may be generated, for example in software, as opposed to being captured by one or more sensors. In either case, such point clouds may include large amounts of data and may be costly and time-consuming to store and transmit. Also, other types of 3D volumetric content, such as immersive video, may be generated from similar types of sensors, or from the use of multiple cameras located on known viewing angles, wherein images captured from the multiple cameras are used to determine depths of points in the 3D volumetric content and also associated attribute values.

Such a point could may be represented by a three-dimensional volumetric representation, such as a point cloud or other three-dimensional volumetric representations, such as a three-dimensional mesh comprising a plurality of polygons with connected vertices that models a surface of the point cloud. Moreover, texture or attribute values of the point cloud may be overlaid on the mesh to represent the attribute or texture of the point cloud when modelled as a three-dimensional mesh.

Additionally, a three-dimensional mesh may be generated, for example in software, without first being modelled as a point cloud. For example, the software may generate the three-dimensional mesh and apply texture or attribute values to represent an object.

SUMMARY OF EMBODIMENTS

In some embodiments, a system includes a computer readable medium storing program instructions. For example, the computer readable medium may store program instructions for implementing a streaming service, and may be executed by one or more processors of a server of the streaming service.

The program instructions, when executed by one or more processors, cause the one or more processors to receive information for a three-dimensional point cloud representing an object or scene, wherein the point cloud comprises a plurality of points, and wherein respective ones of the points comprise spatial information and attribute information for the point. The program instructions also cause the one or more processors to segment the point cloud into a plurality of sub-point clouds comprising sub-sets of the plurality of points of the point cloud, wherein respective ones of the sub-point clouds comprise points of the point cloud included in respective viewing areas. The viewing areas cover three-dimensional volumes of space encompassing respective ones of the sub-point clouds, but omitting other ones of the sub-point clouds. Thus a portion of the point cloud included in a three-dimensional volume of space corresponding to a given viewing area may be viewed from multiple viewports with various viewing angles within the volume, but does not include the full point cloud such that at least some other portions of the point cloud are omitted from the sub-point cloud corresponding to the given viewing area. However, such other portions of the point cloud may be visible in other viewing areas that include other ones of the sub-point clouds. The program instructions also cause the one or more processors to encode the sub-points clouds.

For example, a point cloud may be viewable via multiple viewing areas, which respectively include multiple viewports views, around a circumference of the point cloud and/or at different distances from the point cloud. In some embodiments, such viewing areas may be defined and communicated to a client device that is to receive streaming data from a streaming service. Also, the segmentation of the point cloud into sub-point clouds may be done in accordance with the defined viewing areas, such that different ones of the encoded sub-point clouds correspond to portions of the point cloud viewable from the different ones of the defined viewing areas.

Additionally, the program instructions cause the one or more processors to provide, in response to a request for one or more viewing areas of the point cloud, one or more of the encoded sub-point clouds which correspond to the one or more requested viewing areas, wherein the one or more encoded sub-point clouds for the requested one or more viewing areas are provided in a bit stream without including other ones of the sub-point clouds corresponding to other viewing areas of the point cloud that were not requested.

For example, as opposed to streaming a full representation of a point cloud to a client device, which may include a large amount of data and may take a non-trivial amount of time to complete, a streaming service may instead stream only a portion of the point cloud to the client device that corresponds to a viewing area to be rendered at the client device. If the client device is manipulated such that the client device views another portion of the point cloud corresponding to another viewing area, the streaming service may stream additional sub-point cloud(s) to the client device. However, the sub-point clouds may include a smaller amount of data and may take a shorter amount of time to stream to the client device than the full point cloud. This may improve streaming latency and reduce a quantity of data that needs to be transmitted to a client device at any one given time. Additionally, in some embodiments, multiple viewing areas may be streamed to the client device (but not all) and the client device may transition between different viewing areas based on manipulation of the client device and may further request additional viewing areas based on the manipulation of the client device.

In some embodiments, a device includes a computer readable medium storing program instructions. For example, the computer readable medium may store program instructions for implementing a client device that receives point cloud data from a streaming service, and the program instructions may be executed by one or more processors of the client device.

The program instructions, when executed by one or more processors, cause the one or more processors to receive or access metadata indicating a plurality of viewing areas for a point cloud and determine, based on a user input, one or more viewing areas of the point cloud that are to be viewed. Additionally, the program instructions cause the one or more processors to request the one or more viewing areas of the point cloud and receive one or more encoded sub-point clouds corresponding to the one or more requested viewing areas. Furthermore, the program instructions cause the one or more processors to reconstruct portions of the point cloud corresponding to the one or more viewing areas using the received one or more encoded sub-point clouds.

In some embodiments, a device includes a computer readable medium storing program instructions. For example, the computer readable medium may store program instructions for implementing a rendering device, and may be executed by one or more processors of the rendering device.

The program instructions may cause the one or more processors to receive a user input indicating one or more viewing areas of a point cloud that are to be rendered and determine, based on a metadata mapping of patches of a compressed point cloud to respective viewing areas, which of the patches of the compressed point cloud correspond to the one or more viewing areas to be rendered. The program instructions may further cause the one or more processors to render a portion of the point cloud corresponding to the one or more viewing areas using the identified patches of the compressed point cloud without necessarily reconstructing the whole point cloud.

Figure 1A:
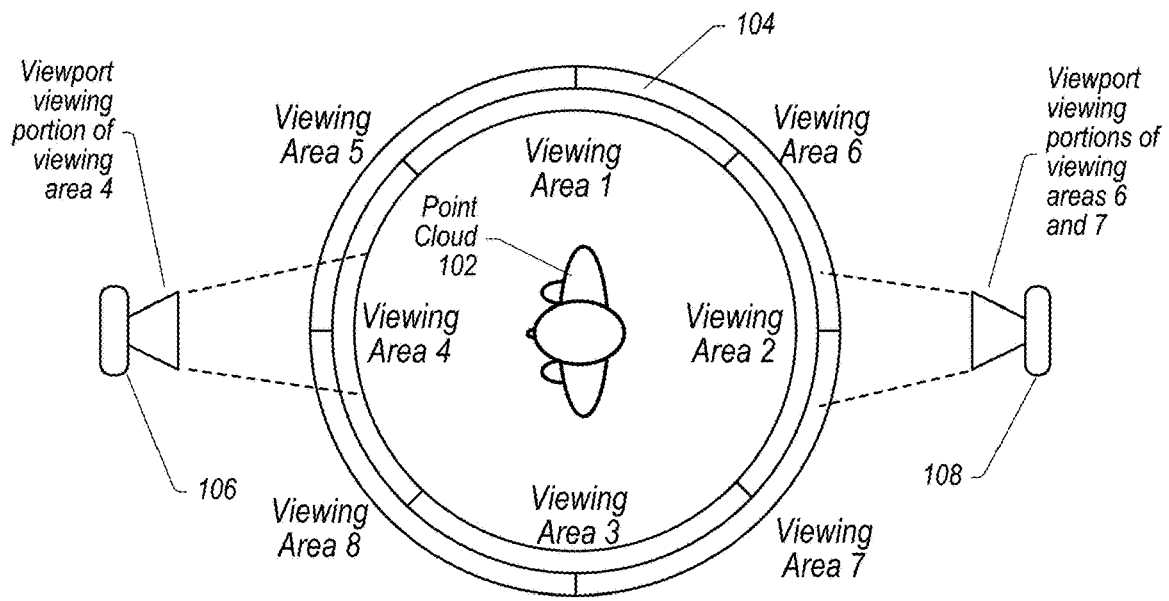
FIG. 1A illustrates a point cloud and a plurality of viewing areas for the point cloud, wherein a viewport can be positioned to view the point cloud from multiple different views within each of the respective viewing areas around a circumference of the point cloud, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

As data acquisition and display technologies have become more advanced, the ability to capture three-dimensional volumetric representations, such as point clouds, immersive video content, etc. comprising thousands or millions of points in 3-D space has increased. Also, the development of advanced display technologies, such as virtual reality or augmented reality systems, has increased potential uses for volumetric representations, such as point clouds, immersive video, etc. However, volumetric content files are often very large and may be costly and time-consuming to store and transmit. For example, communication of volumetric point cloud or immersive video content over private or public networks, such as the Internet, may require considerable amounts of time and/or network resources, such that some uses of volumetric data, such as real-time uses, may be limited. Also, storage requirements of volumetric point cloud or immersive video content files may consume a significant amount of storage capacity of devices storing such files, which may also limit potential applications for using volumetric point cloud or immersive video content.

In some embodiments, an encoder may be used to generate a compressed version of three-dimensional volumetric representations to reduce costs and time associated with storing and transmitting large volumetric point cloud or immersive video content files. In some embodiments, a system may include an encoder that compresses attribute and/or spatial information of a volumetric point cloud or immersive video content file such that the file may be stored and transmitted more quickly than non-compressed volumetric point cloud or immersive video content and in a manner that the compressed volumetric point cloud or immersive video content file may occupy less storage space than non-compressed volumetric point cloud or immersive video content. In some embodiments, such compression may enable three-dimensional volumetric information to be communicated over a network in real-time or in near real-time.

In some embodiments, a system may include a decoder that receives one or more sets of volumetric point cloud or immersive video content data comprising compressed attribute information via a network from a remote server or other storage device that stores the one or more volumetric point cloud or immersive video content files. For example, a 3-D display, a holographic display, or a head-mounted display may be manipulated in real-time or near real-time to show different portions of a virtual world represented by volumetric point cloud or immersive video content. In order to update the 3-D display, the holographic display, or the head-mounted display, a system associated with the decoder may request data from the remote server based on user manipulations of the displays, and the data may be transmitted from the remote server to the decoder in form of viewing areas and decoded by the decoder in real-time or near real-time. The displays may then be updated with updated data responsive to the user manipulations, such as updated views within a given viewing area, or another viewing area may be requested and transmitted to the decoder. Also, in some embodiments, a decoder may render multiple ones of the viewing areas at the same time, such as adjacent viewing areas. Thus, in some embodiments, instead of switching between viewing areas a smooth transition may be performed when viewing of the object or scene is transitioned from one viewing area to another viewing area.

In some embodiments, a system includes one or more LIDAR systems, 3-D cameras, 3-D scanners, etc., and such sensor devices that capture spatial information, such as X, Y, and Z coordinates for points in a view of the sensor devices. In some embodiments, the spatial information may be relative to a local coordinate system or may be relative to a global coordinate system (for example, a Cartesian coordinate system may have a fixed reference point, such as a fixed point on the earth, or may have a non-fixed local reference point, such as a sensor location).

In some embodiments, such sensors may also capture attribute information for one or more points, such as color attributes, texture attributes, reflectivity attributes, velocity attributes, acceleration attributes, time attributes, modalities, and/or various other attributes. In some embodiments, other sensors, in addition to LIDAR systems, 3-D cameras, 3-D scanners, etc., may capture attribute information to be included in volumetric point cloud or immersive video content. For example, in some embodiments, a gyroscope or accelerometer, may capture motion information to be included in a point cloud as an attribute associated with one or more points of the point cloud. For example, a vehicle equipped with a LIDAR system, a 3-D camera, or a 3-D scanner may include the vehicle's direction and speed in a point cloud captured by the LIDAR system, the 3-D camera, or the 3-D scanner. For example, when points in a view of the vehicle are captured they may be included in a point cloud, wherein the point cloud includes the captured points and associated motion information corresponding to a state of the vehicle when the points were captured.

Viewport Adaptive Streaming and/or Rendering

Three-dimensional volumetric content, such as point clouds, immersive video, meshes, etc., allow viewers to explore dynamic objects, such as an avatar, with multiple degrees of freedom. While compression techniques, such as video-based compression or geometry based compression as described herein, may reduce an amount of information required to signal and/or reconstruct dynamic objects, the file sizes or bit stream sizes may never the less be large and may require significant amounts of bandwidth to transmit.

Also, some dynamic objects may have characteristics such that the full object is not viewable from a given viewing angle. For example, for an avatar that is representing a human, a back of the avatar may not be viewable when looking at the avatar from the front. Thus, to render the avatar when viewed from the front, it may not be necessary to stream or render the back portion of the avatar (e.g. a back viewing area) that is hidden when the avatar is viewed from the front (e.g. from a front viewing area). Note that an avatar is given as an example of an object for which viewport adaptive streaming or rendering may be employed. However, such techniques may be employed with regard to various other types and sizes of objects or scenes.

Also, in some viewing environments, such as head-mounted displays a viewing angle and/or distance to an object being viewed may remain constant or change at a relatively slow pace. For example a large translational movement, such as walking from the front of an avatar to a back of the avatar may take some amount of time, such that new viewing areas of the avatar can be streamed and/or rendered while the translation movement is taking place. Also, future movement may be predicted based on a movement trajectory, such as walking around the avatar, and next viewing areas in the projected line of motion may be streamed and/or rendered.

In some embodiments, a streaming service, such as a server storing information about volumetric point cloud or immersive video content, provides portions of the content that are currently viewable or soon-to-be viewable at a client device without providing the full volumetric point cloud or immersive video content. For example, a point cloud may be segmented into a plurality of viewing areas. A server device and a client device may share a common understanding of the viewing areas, and the client device may request a current viewing area for a view that is to be rendered or request a viewing area for a view that is soon-to-be rendered. In response, the server may provide sub-point clouds corresponding to portions of the point cloud corresponding to the requested viewing areas. In this way bandwidth is not consumed sending data for portions of the point cloud that are not currently or soon-to-be viewed at the client device.

In some embodiments, the viewing areas are defined as 3D volumes in space that intersect the object. In some embodiments, sub-point clouds for each of the viewing areas are separately encoded and stored at a server. A client fetches, from the server, respective ones of the encoded sub-point clouds that correspond to viewing areas for a viewport of the client device or a soon-to-be view of the viewport of the client device to view the object or scene.

In some embodiments, viewing areas may be generated at different distances from an object. For example, with the avatar, a first viewing may encompass a smaller volume extending from the avatar for a first distance (e.g. 5 feet) and another viewing may also be viewing the front of the avatar, but extending out from the avatar to a second distance (e.g. 15 feet).

In some embodiments, viewing areas may be customizable, either by a client device or by an administrator of the server or streaming device. For example, in some embodiments, a number of viewing areas and corresponding encoded portions of the point cloud corresponding to the viewing areas may be adjustable to include more or fewer viewing areas. Also, in some embodiments, volume sizes (such as distances extending out from an object or scene for a given viewing area) may be adjustable, as well as widths and shapes of the viewing areas.

In some embodiments, respective ones of the views overlap. Thus, a smooth transition between views may be achieved. For example, points of the point cloud at an end of a first view may also be included in a sub-point cloud for a next view, such that rendering the sub-point cloud of the first view can transition to rendering the sub-point cloud of the next view without an abrupt change in viewing experience. Also, overlapping viewing areas may reduce the need to stream additional viewing areas. For example, if a manipulation of a client device causes an object or scene to be primarily viewed within a first viewing area with only partial visibility into an adjacent viewing area, an overlap between the primary viewing area and the adjacent viewing area (included in the sub-point cloud corresponding to the primary viewing area) may allow the partial area of the adjacent viewing area to be rendered using the already received sub-point cloud for the primary viewing area as opposed to requesting and streaming another sub-point cloud corresponding to the adjacent viewing area. Also, as the user device is further manipulated to view a portion of the object or scene corresponding to the adjacent viewing area, the user device may be in the process of requesting and receiving streaming data for the adjacent viewing area.

Also, in some embodiments, in addition to, or instead of, viewport adaptive streaming, a client device may perform viewport adaptive rendering. For example, in embodiments that utilize a video-based encoding process to encode patch images of a three-dimensional object or scene using two-dimensional patch images packed into video image frames, metadata may be generated indicating which ones of the patches corresponded to particular ones of a set of defined viewing areas. Thus a rendering client, may select only relevant patches to use in reconstructing a portion of a point cloud viewable from a particular one of the defined viewing areas without necessarily being required to reconstruct the full point cloud including portions that are hidden/not included in the particular one of the defined viewing areas.

In some embodiments, a full encoded point cloud, encoded using a video-based encoding process may be provided to a client device along with patch to viewing area mapping metadata and the client device may perform viewport adaptive rendering. Also, in some embodiments, a server may store a plurality of separately encoded sub-point clouds that have been encoded using a video-based encoding process, and the server device may stream respective ones of the encoded sub-point clouds to a client device based on viewing areas requested by the client device (e.g. viewport adaptive streaming). Also, in some embodiments, other encoding (e.g. compression) techniques may be used to encode sub-point clouds used in viewport adaptive streaming. For example, in some embodiments three-dimensional geometry based encoding techniques may be used such as octree representations of the geometry, K-D trees used to represent the geometry, etc. Also, in such three-dimensional geometry based encoding techniques attribute values and/or textures may be encoded using a region adaptive hierarchical transform (RAHT), interpolation/prediction transform, or other suitable attribute/texture encoding technique.

FIG. 1A illustrates a point cloud and a plurality of viewing areas for the point cloud, wherein a viewport can be positioned to view the point cloud from multiple different views within each of the respective viewing areas around a circumference of the point cloud, according to some embodiments.

As an example, point cloud 102 may be a point cloud to be provided as part of a viewport adaptive streaming or may be a point cloud to be rendered as part of a viewport adaptive rendering. A plurality of viewing areas may be defined for viewing the point cloud from a plurality of viewport positions for each respective viewing area. For example, FIG. 1A illustrates viewport viewing areas 1 through 8. Note that at least some of the viewing areas overlap one another. For example, viewing area 6 and viewing area 7 overlap viewing area 2. Thus as viewport 108 translates from the position shown in FIG. 1A towards the right-hand shoulder of the avatar of point cloud 102, the next encountered viewing area may be viewing area 6 that overlaps viewing area 2. If the viewport 108 continues to move around the circumference of point cloud 102, a next encountered viewing area may be viewing area 1 that overlaps viewing area 6. Thus a client device that has retrieved viewing area 2 and is retrieving/retrieved viewing area 6 will have information for a same sub-set of points of the point cloud both in viewing area 2 and viewing area 6 (or other ones of the overlapping viewing areas). In this way the points of a first sub-point cloud for a first viewing area and points of a second sub-point cloud for a second viewing area that overlaps the first viewing area may represent the same points in the actual point cloud. This may reduce oscillations between sub-point clouds corresponding to different viewing areas, when different portions of the point cloud 102 are to be rendered/viewed.

Figure 1B:
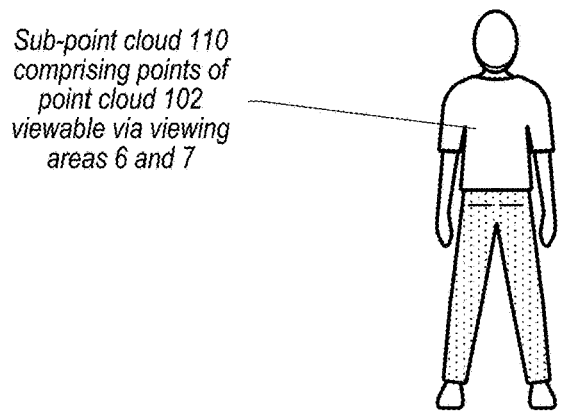
FIGS. 1B and 1C illustrate portions of the point cloud viewable when viewed from different ones of the viewing areas, wherein the portions of the point cloud are segmented into sub-point clouds for the different viewing areas, according to some embodiments.
Figure 1C:
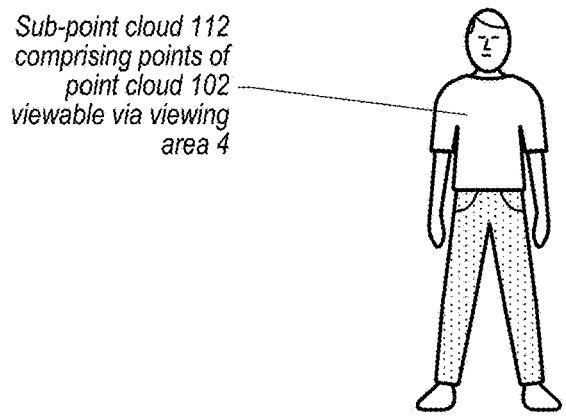

FIGS. 1B and 1C illustrate portions of the point cloud viewable from different ones of the viewing areas, wherein the portions of the point cloud are segmented into sub-point clouds for the different viewing areas, according to some embodiments.

As can be seen in FIG. 1B when point cloud 102 is viewed from the front such as in viewing area 2, not all of the point cloud is visible. Instead only a portion of the point cloud is visible. Thus, the point cloud may be segmented into sub-point clouds that only include points visible from a particular viewing area. For example, sub-point cloud 110 comprises points of point cloud 102 that are viewable when viewport 108 is located at a position within viewing area 2. As another example, FIG. 1C illustrates points of point cloud 112 which comprises a sub-set of the points of point cloud 102 that are viewable from viewport 106 when positioned within viewing area 4. It is worth pointing out that within a given viewing area a viewport, such as the viewport 106 or 108, may be positioned at various angles, heights, side-to-side positions, etc. such that multiple different views of the sub-point cloud corresponding to the given viewing area may be rendered using the points of the sub-point cloud corresponding to the given viewing area.

Figure 2A:
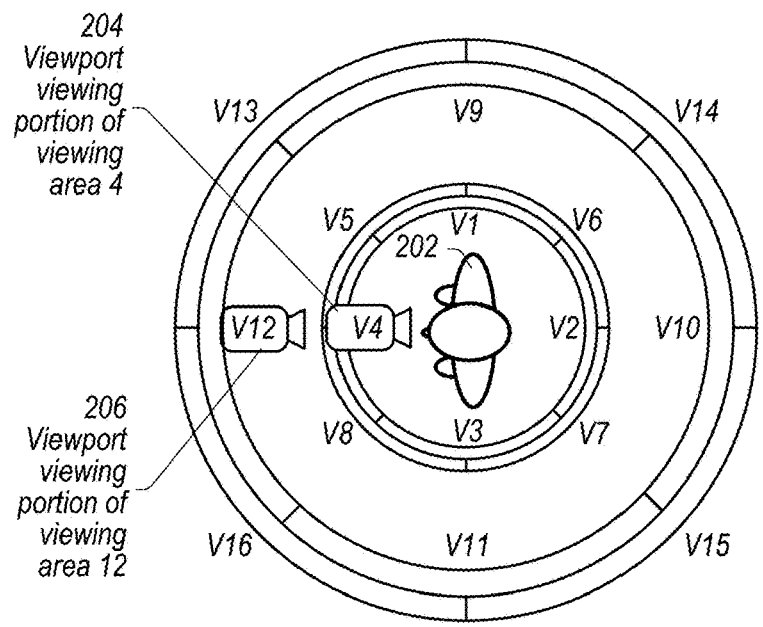
FIG. 2A illustrates a point cloud and a plurality of viewing areas for the point cloud positioned around a circumference of the point cloud, wherein the viewing areas include views at different distances from the point cloud, according to some embodiments.

FIG. 2A illustrates a point cloud and a plurality of viewing areas of the point cloud around a circumference of the point cloud, wherein the viewing areas include views at different distances from the point cloud, according to some embodiments.

In addition to different viewport positions/angles viewports may be located at different distances from a point cloud to define additional viewing areas. For example, FIG. 2A illustrates 16 defined viewing areas for point cloud 202 including eight viewing areas that extend out to a first distance from point cloud 202 and an additional 8 views that extend out to a second distance from point cloud 202.

Figure 2B:
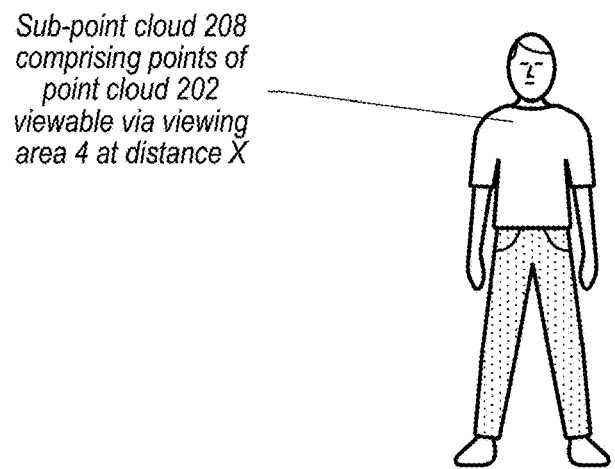
FIGS. 2B and 2C illustrate portions of the point cloud viewed from different ones of the viewing areas at different distances from the point cloud, wherein the portions of the point cloud are segmented into sub-point clouds for the different viewing areas, according to some embodiments.
Figure 2C:
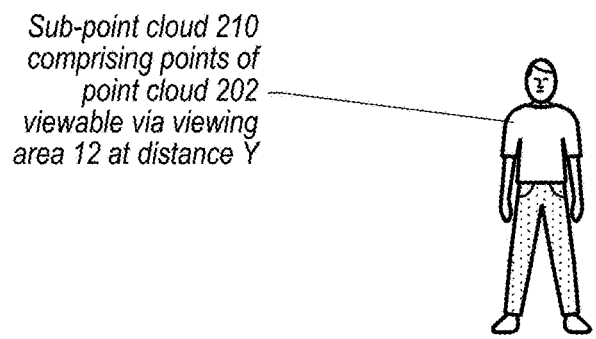

FIGS. 2B and 2C illustrate portions of the point cloud viewed from within different ones of the viewing areas at different distances from the point cloud, wherein the portions of the point cloud are segmented into sub-point clouds for the different viewing areas, according to some embodiments.

FIG. 2B represents a sub-set of the points of a sub-point cloud 208 of point cloud 202 that are viewable via viewport 204 located within viewing area 4, which is a distance X from point cloud 202. FIG. 2C represents a different sub-point cloud 210 of point cloud 202 when viewed from viewing area 12, such as via viewport 206 located within viewing area 12, which is a distance Y from point cloud 202. In some embodiments, a number of points included in the respective viewing areas may be different. For example, sub-point cloud 210 may include fewer points (e.g. a lower resolution of points) than are included in sub-point cloud 208.

Figure 3A:
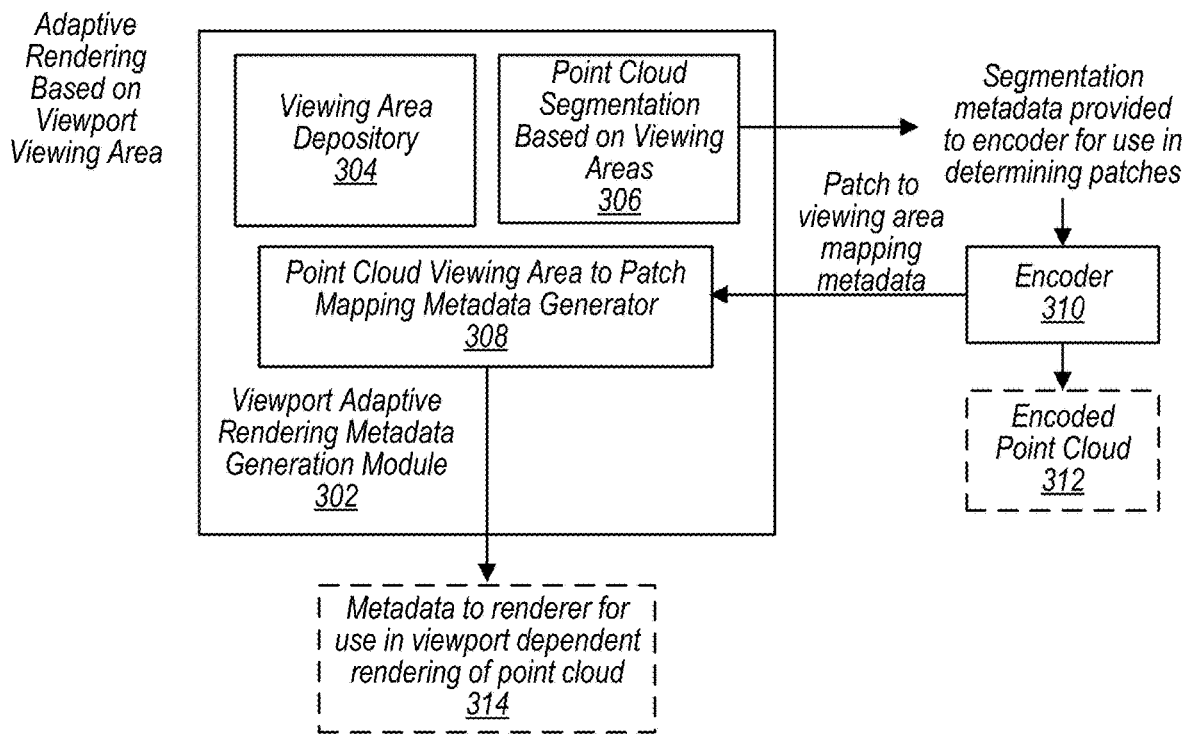
FIG. 3A illustrates a block-diagram of an example viewport adaptive rendering metadata generation module, according to some embodiments.

FIG. 3A illustrates a block-diagram of an example viewport adaptive rendering metadata generation module, according to some embodiments.

Viewport adaptive rendering metadata generation module 302 includes a viewing area depository 304, a point cloud segmentation based on viewing areas module 306 and a point cloud viewing area to patch mapping metadata generator 308.

Viewing area depository 304 may store definitions for viewing areas, such as viewing areas 1 through 8 shown in FIG. 1A or viewing areas 1 through 16 shown in FIG. 2A. In some embodiments, the viewing areas may be customizable by an administrator or upon request from a client device. In such circumstances, updated or modified viewing areas may be stored in viewing area depository 304.

Point cloud segmentation based on viewing areas module 306 determines portions of the point cloud that correspond to the viewing areas stored in viewing area depository 304. Point cloud segmentation based on viewing areas module 306 may further provide segmentation metadata to encoder 310 for use in determining patches. For example, encoder 310 may be an encoder similar to encoder 800 illustrated in FIG. 8 that includes a decomposition into patches module 806. The segmentation metadata provided by point cloud segmentation based on viewing areas module 306 may be provided to decomposition into patches module 806 of encoder 800, which may follow a segmentation process as described in FIGS. 10A-10C. However, the segmentation process may be adapted, such that patches are constrained to be included in different ones of the respective viewing areas. Thus, patch images generated for the patches may be packed into image frames corresponding to the different ones of the viewing areas. In other embodiments, auxiliary patch information, such as which is compressed by auxiliary patch information compression module 822 may also include metadata mapping patches to viewing areas. Thus a decoder performing viewport adaptive rendering may identify patches corresponding to a particular viewing area to be rendered based on their inclusion in a packed image frame comprising patches for the particular viewing area and/or may identify the patches corresponding to the particular viewing area based on mapping metadata included in the auxiliary information for the point cloud.

Point cloud viewing area to patch mapping metadata generator 308 may generate mapping metadata for locating patches corresponding to particular viewing area of an encoded point cloud. For example, when encoder 310 determines patches, taking into account segmentation based on viewing area, point cloud viewing area to patch mapping metadata generator 308 may track/identify which patches for which viewing areas where packed into which video image frames at which locations. The point cloud viewing area to patch mapping metadata generator 308 may generate metadata that can be used by a decoder to locate patches corresponding to a particular viewing area that is to be rendered. For example, in some embodiments, metadata 314 may be provided to a rendering device along with encoded point cloud 312 and the rendering device may use the metadata 314 to identify patches of the encoded point cloud 312 to use to reconstruct a particular viewing area of the point cloud. In some embodiments, metadata 314 may be incorporated into the patch auxiliary information of the encoded point cloud 312.

Figure 3B:
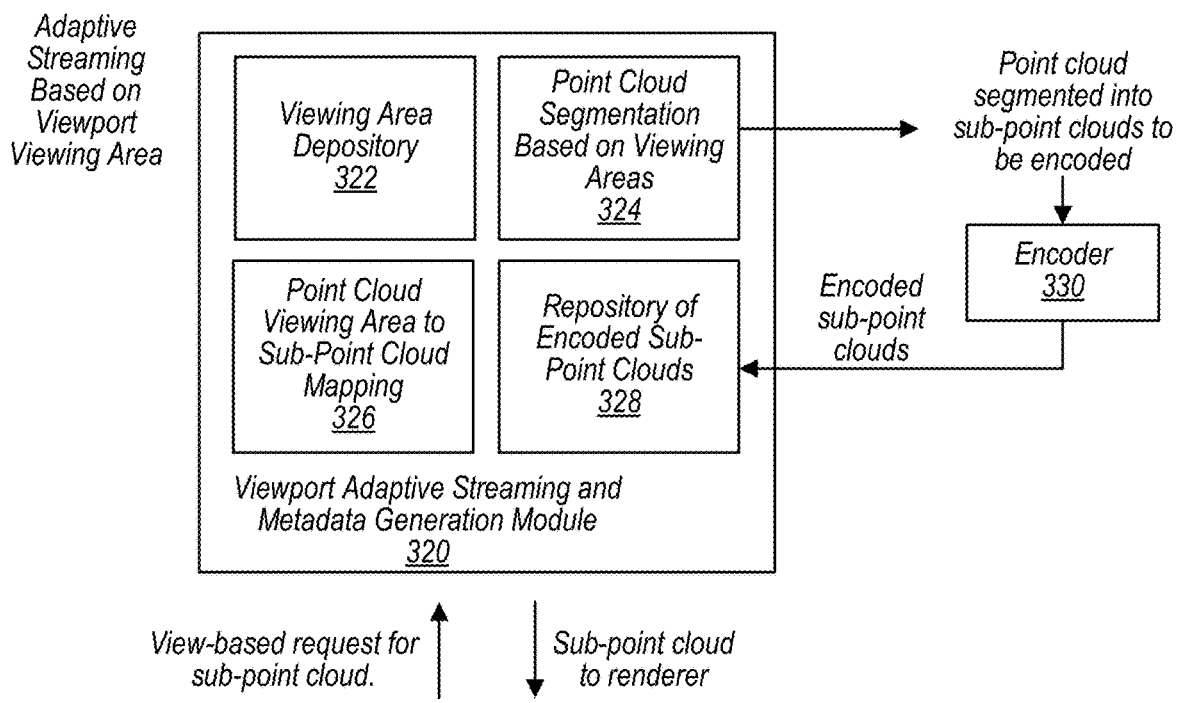
FIG. 3B illustrates a block-diagram of an example viewport adaptive streaming and metadata generation module, according to some embodiments.

FIG. 3B illustrates a block-diagram of an example viewport adaptive streaming and metadata generation module, according to some embodiments.

As an alternative to providing the full point cloud and performing viewport adaptive rendering as discussed in regard to FIG. 3A, an entity may perform viewport adaptive streaming. This entity may be an encoder, a streaming service, a server, or other suitable source of encoded point cloud data, depending on implementation.

Viewport adaptive streaming and metadata generation module 320 includes viewing area depository 322, point cloud segmentation based on viewing areas module 324, point cloud viewing area to sub-point cloud mapping store 326 and repository of encoded sub-point clouds 328. In some embodiments, viewing area depository 322 may store defined viewing areas from which a point cloud may be viewed via any number of viewport views within the respective viewing areas (but omitted other portions of the point cloud corresponding to other viewing areas). Also, point cloud segmentation based on viewing areas module 324 may partition the point cloud into a plurality of sub-point clouds, each sub point cloud comprising a sub-set of the points of the overall point cloud that are viewable from any number of viewport views within a given viewing area corresponding to the sub-point cloud. The sub-point clouds may be provided to encoder 330, which may be an encoder, such as encoder 800 illustrated in FIG. 8 or, which may be a geometry based encoder such as the encoders/encoding processes described in FIGS. 11-13. Note that in some embodiments, a geometry based encoding technique may generate an encoded/compressed representation, such as an octree, K-D tree, etc. for each of the sub-point clouds. Alternatively, geometry information may be generated and/or encoded as mesh or sub-mesh in some embodiments. Also, compressed attribute information may also be generated for each of the respective sub-point clouds.

The compressed versions of each of the sub-point clouds may be stored in repository of encoded sub-point clouds 328. Also, mapping information that indicates which of the stored encoded sub-point clouds corresponds to which of the viewing areas may be generated/maintained by point cloud viewing area to sub-point cloud mapping module 326.

The viewport adaptive streaming and metadata generation module 320 may receive a request from a client requesting one or more particular viewing areas of the point cloud and may use the mapping information of point cloud viewing area to sub-point cloud mapping module 326 to identify corresponding ones of the encoded sub-point clouds stored in the repository of encoded sub-point clouds 328 that correspond to the requested viewing areas. Accordingly, viewport adaptive streaming and metadata generation module 320 causes the matching sub-point clouds, that match the requested views, to be provided to the requesting client.

Figure 4A:
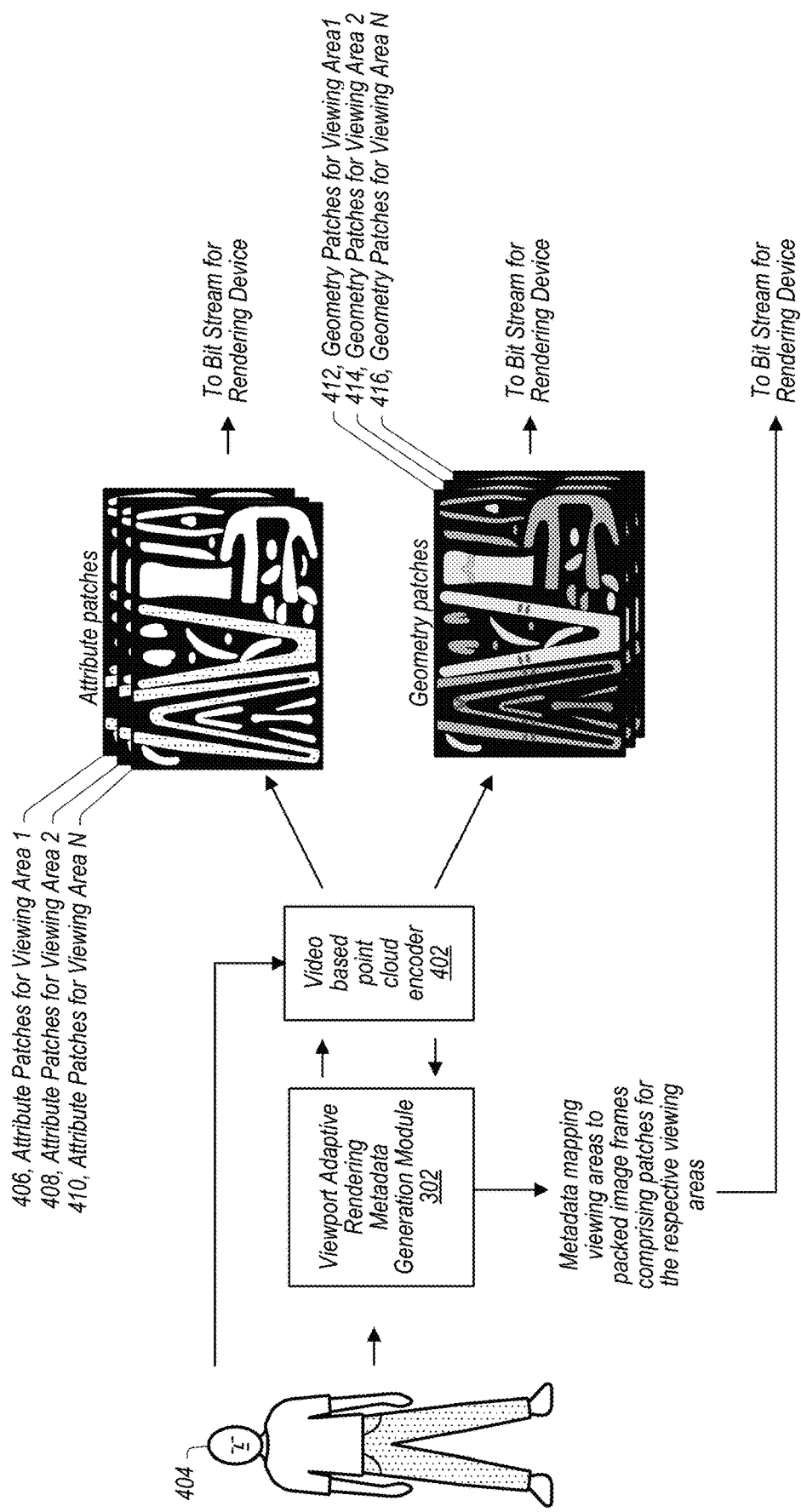
FIG. 4A illustrates an example process of providing an encoded point cloud and metadata for use in rendering the point cloud using viewport adaptive rendering, according to some embodiments.

FIG. 4A illustrates an example process of providing an encoded point cloud and metadata for use in rendering the point cloud using viewport adaptive rendering, according to some embodiments.

Point cloud 404 is provided to viewport adaptive rendering and metadata generation module 302, which generates metadata mapping viewing areas to packed image frames comprising patches of the point cloud when viewed from within the respective viewing areas. The point cloud 404 and segmentation metadata generated by viewport adaptive rendering metadata generation module 302 are provided to the video-based point cloud encoder 402. Also, information indicating patch locations for patches corresponding to the different viewing areas is provided back to viewport adaptive rendering metadata generation module from video-based point cloud encoder 402.

Metadata mapping viewing areas to packed image frames comprising patches for the respective viewing areas is included in a compressed bit stream for the point cloud 404 along with attribute patches 406, 408, and 410 and geometry patches 412, 414, and 416. In some embodiments, the attribute patches and the geometry patches for different viewing areas may be packed into different two dimensional video image frames as shown in FIG. 4A. Also in some embodiments, attribute or geometry patches for different viewing areas may be packed into a same two dimensional video image frame, wherein patch auxiliary information indicates which patches correspond to which viewing areas.

Figure 4B:
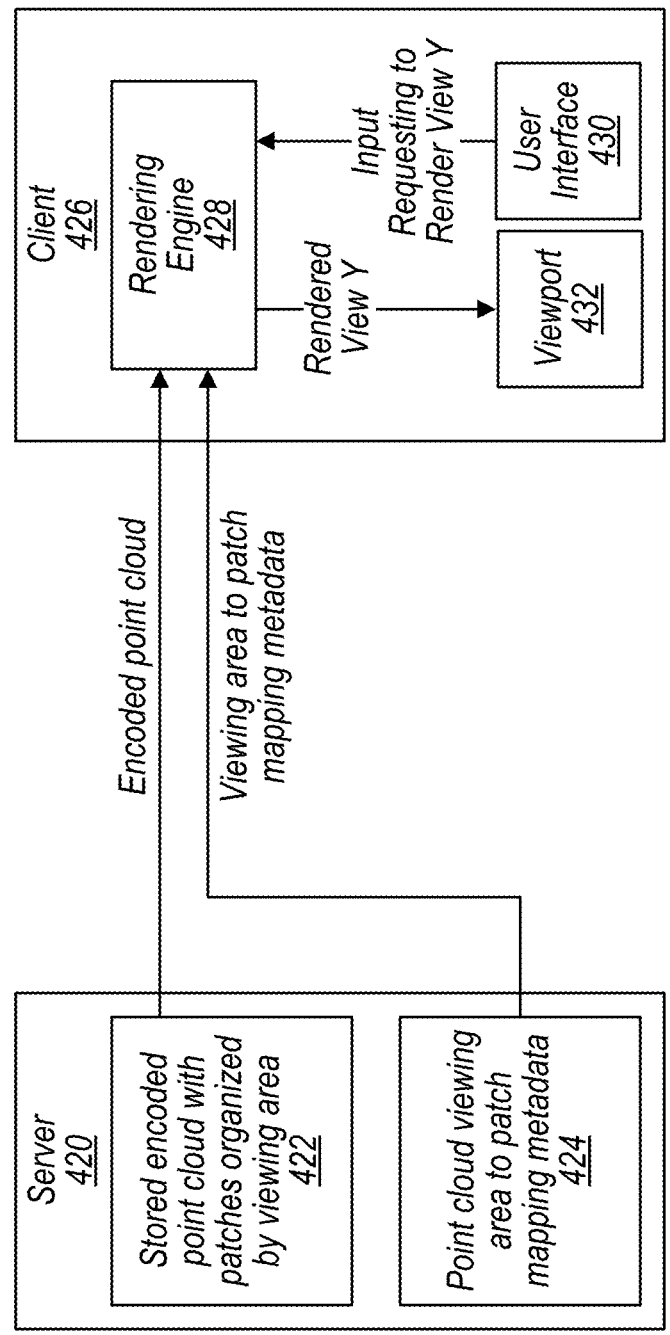
FIG. 4B illustrates interactions between a server of a streaming service and a client device that performs viewport adaptive rendering, according to some embodiments.

FIG. 4B illustrates interactions between a server of a streaming service and a client device that performs viewport adaptive rendering, according to some embodiments.

Server 420 stores an encoded point cloud with patches organized by viewing area 422 and also stores point cloud viewing area to patch mapping metadata 424. Server 420 provides the encoded point cloud with patches organized by viewing area to client 426 and also provides viewing area to patch mapping metadata to client 426.

Client 426 receives user input indicating a viewing area from which the point cloud is to be displayed via user interface 430. The rendering engine 428 of client 426 determines patches of the encoded point cloud corresponding to the requested viewing area and renders the requested view to viewport 432.

Figure 5A:
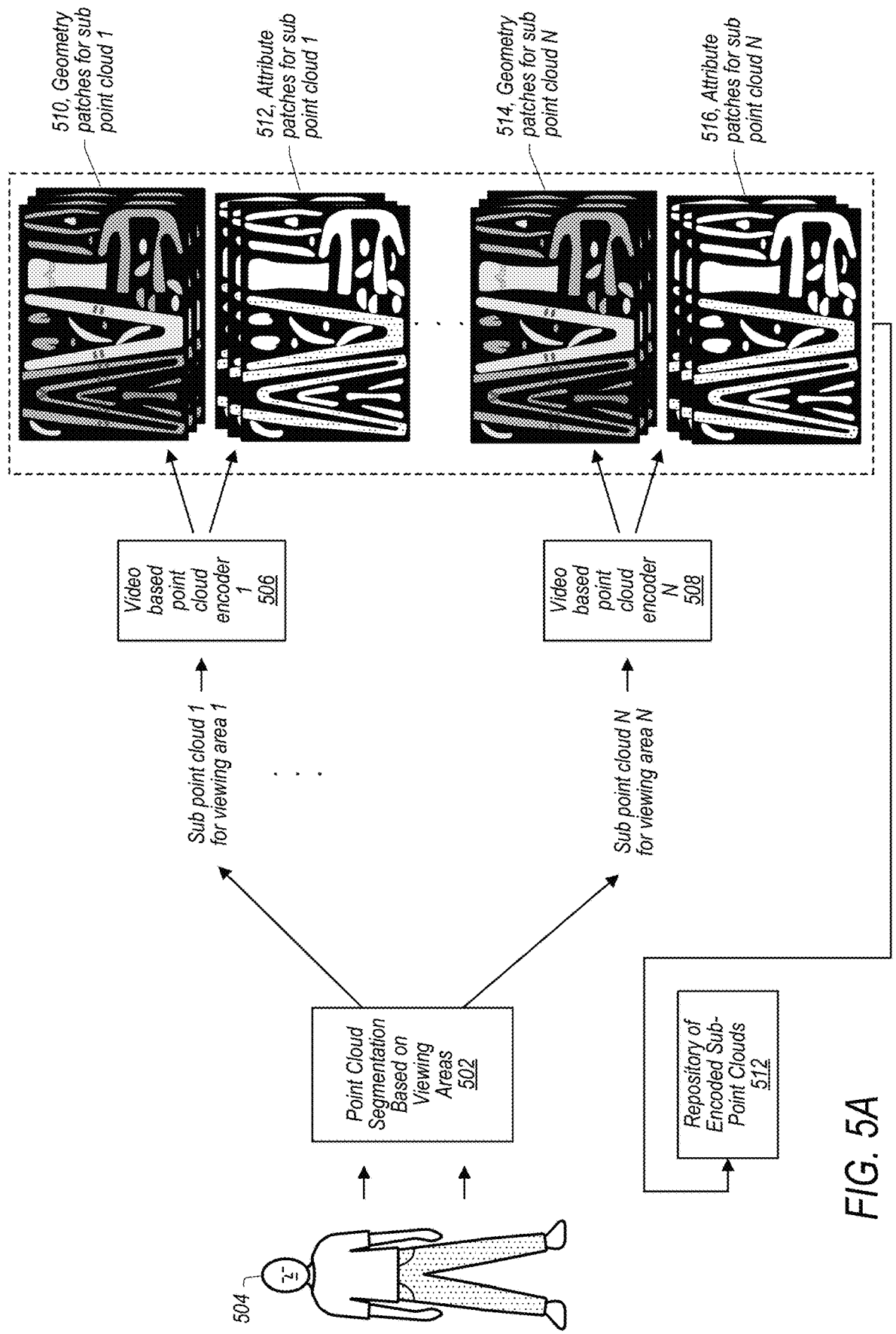
FIG. 5A illustrates an example process of generating sub-point clouds for use in viewport adaptive streaming, according to some embodiments.

FIG. 5A illustrates an example process of generating sub-point clouds for use in viewport adaptive streaming, according to some embodiments.

Point cloud 504 is provided to point cloud segmentation based on viewing areas module 502, which may be the same as the point cloud segmentation based on viewing areas module 324 of FIG. 3B. The point cloud segmentation based on viewing areas module 502 segments the point cloud 504 into sub-point clouds each comprising points viewable from one of a plurality of defined viewing areas, such as v viewing areas 1 through 8 shown in FIG. 1A or viewing areas 1 through 16 shown in FIG. 2B. Each of the sub-point clouds is encoded to generate an encoded sub-point cloud, for example via video-based point cloud encoders 506 through 508. In some embodiments, a same encoder may sequentially encode the sub-point clouds, or the sub-point clouds may be encoded in parallel using more than one encoder. A set of geometry patch images and attribute patch images is generated for each of the sub-point clouds, such as geometry patch images 510 and attribute patch images 512 for sub-point cloud 1 and geometry patch images 514 and attribute patch images 516 for sub-point cloud N. Note that in some embodiments, other types of encoders may be used to encode the sub-point clouds, such as geometry based encoders as described in FIGS. 11-13.

In some embodiments, point cloud 504 may be a dynamic point cloud comprising multiple frames of the point cloud at multiple moments in time. In some embodiments, geometry patches 510 and attribute patches 512 may include patches for multiple frames in time of point cloud 504 when viewed from within viewing area 1. Likewise, geometry patches 514 and attribute patches 516 may include patches for multiple frames in time of point cloud 504 when viewed from within viewing area N.

Figure 5B:
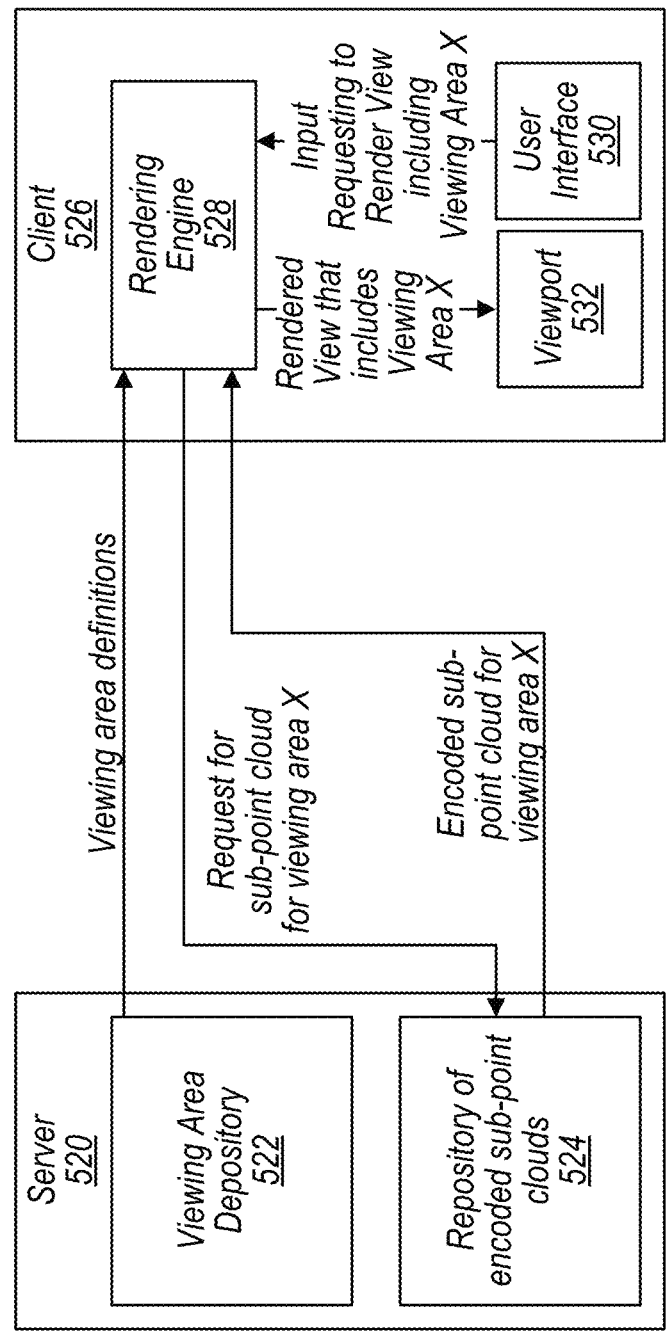
FIG. 5B illustrates interactions between a server of a streaming service and a client device, wherein the streaming service implements viewport adaptive streaming, according to some embodiments.

FIG. 5B illustrates interactions between a server of a streaming service and a client device, wherein the streaming service implements viewport adaptive streaming, according to some embodiments.

Server 520 includes viewing area depository 522 which defines available viewing areas and also includes repository of encoded sub-point clouds 524. Server 520 provides client 526 with viewing area definitions. Client 526 receives a user input via user interface 530 indicating a particular viewing area from which a portion of the point cloud is to be displayed via viewport 532 and sends a request for a sub-point cloud for the requested viewing area to server 520. Server 520 receives a request from client 526 requesting one or more viewing areas of a point cloud. The server 520, in response to the request, provides sub-point clouds corresponding to the requested viewing areas. Rendering engine 528 then renders the requested view of the requested viewing area in viewport 532 using the provided sub-point cloud. In response to additional user inputs received via user interface 530, indicating different views are to be displayed in viewport 532, client 526 may send additional requests to server 520 for other sub-point clouds corresponding to other viewing areas of the point cloud.

Figure 6A:
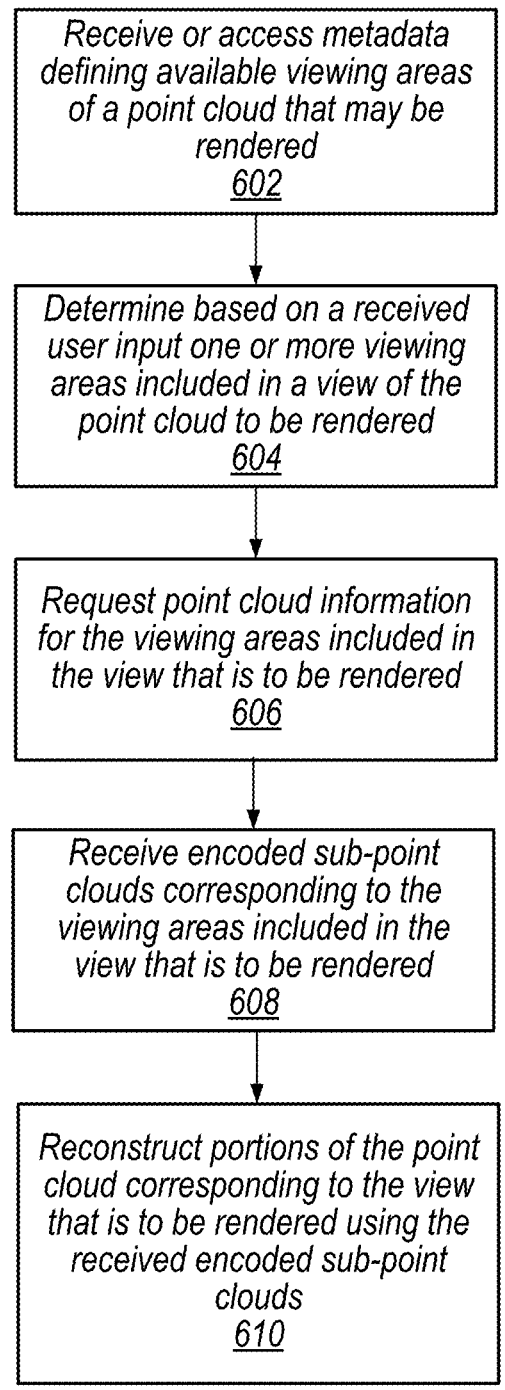
FIG. 6A is a flow diagram illustrating a process followed by a client device to reconstruct a portion of a point cloud to be viewed using viewport adaptive streaming, according to some embodiments.

FIG. 6A is a flow diagram illustrating a process followed by a client device to reconstruct a portion of a point cloud to be viewed using viewport adaptive streaming, according to some embodiments. At block 602, a client receives or accesses metadata defining available viewing area of a point cloud that may be rendered at the client device. At block 604, the client device determines based on a received user input one or more views of the point cloud that are to be rendered and/or also determines one or more viewing areas for which the respective views of the point cloud are to be rendered. At block 606, the client device sends a request for point cloud information for the viewing area/viewing areas that are to be rendered. At block 608, the client device receives one or more encoded sub-point clouds corresponding to one or more requested viewing areas. At block 610, the client device reconstructs portions of the point cloud corresponding to the views that are to be rendered from within the one or more viewing areas using the received encoded sub-point clouds.

Figure 6B:
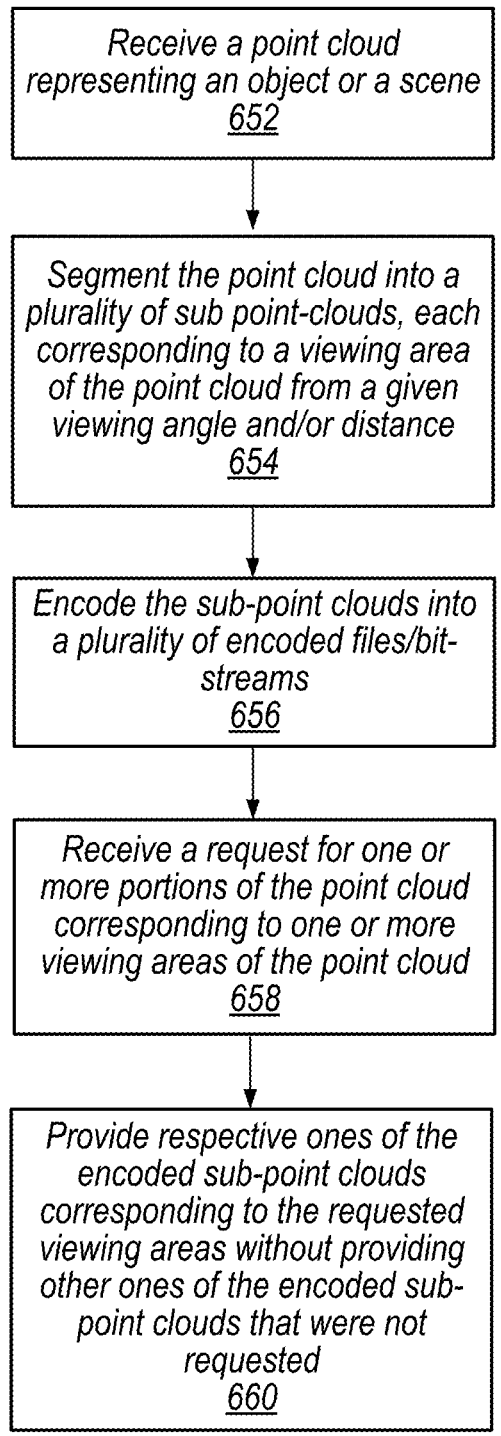
FIG. 6B is a flow diagram illustrating a process followed by a server device to provide portions of a point cloud to a client device using viewport adaptive streaming, according to some embodiments.

FIG. 6B is a flow diagram illustrating a process followed by a server device to provide portions of a point cloud to a client device using viewport adaptive streaming, according to some embodiments. At block 652, a server/encoder receives a point cloud representing an object or a scene. At block 654, the server/encoder segments the point cloud into a plurality of sub point-clouds, each corresponding to a viewing area of the point cloud from within which multiple viewport viewing angles and/or distances are possible. At block 656, the server/encoder encodes the sub-point clouds into a plurality of encoded files/bit-streams. At block 658, the server/encoder receives a request for one or more portions of the point cloud corresponding to one or more viewing areas of the point cloud. At block 660, the server/encoder provides respective ones of the encoded sub-point clouds corresponding to the requested viewing areas without providing other ones of the encoded sub-point clouds that were not requested.

Figure 7A:
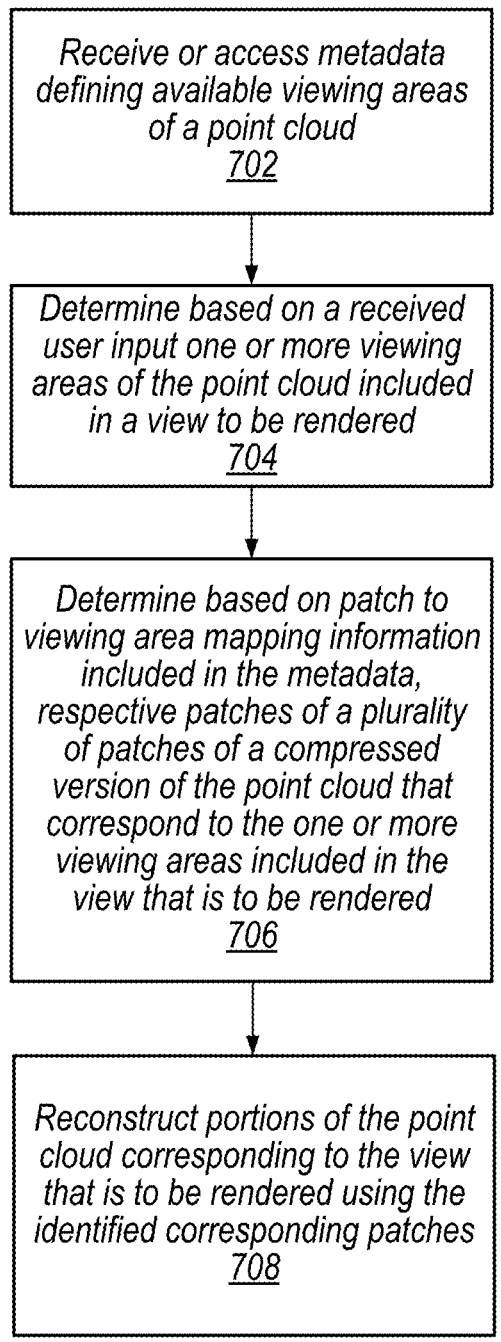
FIG. 7A is a flow diagram illustrating a process of reconstructing a point cloud using viewport adaptive rendering, according to some embodiments.

FIG. 7A is a flow diagram illustrating a process of reconstructing a point cloud using viewport adaptive rendering, according to some embodiments. At block 702, a client device receives or accesses metadata defining available viewing areas of a point cloud that may be rendered. At block 704, the client device determines based on a received user input one or more viewing areas from which views of the point cloud are to be rendered. At block 706, the client device determines based on patch to view mapping information included in the metadata, respective patches of a plurality of patches of a compressed version of the point cloud that correspond to the one or more viewing areas from which views of the point cloud are to be rendered. At block 708, the client device reconstructs portions of the point cloud corresponding to the viewing areas using the identified corresponding patches.

Figure 7B:
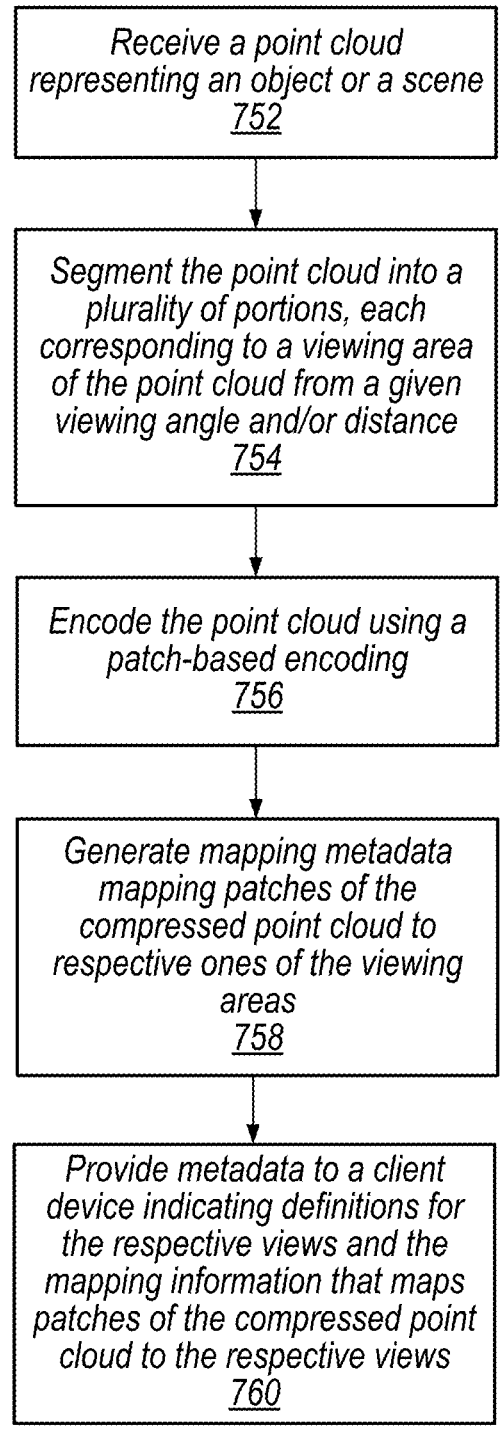
FIG. 7B is a flow diagram illustrating a process of generating metadata for use in performing viewport adaptive rendering of a point cloud, according to some embodiments.

FIG. 7B is a flow diagram illustrating a process of generating metadata for use in performing viewport adaptive rendering of a point cloud, according to some embodiments. At block 752, a server/encoder receives a point cloud representing an object or scene. At block 754, the server/encoder segments the point cloud into a plurality of portions, each corresponding to a viewing area of the point cloud for a plurality of viewport viewing angles and/or distances. At block 756, the server/encoder encodes the point cloud using a patch-based encoding technique. At block 758, the server/encoder generates mapping metadata mapping patches of the compressed point cloud to respective ones of the viewing areas. At block 760, the server/encoder provides metadata to a client device indicating definitions for the respective viewing areas and the mapping information that maps patches of the compressed point cloud to the respective viewing areas.

Example Patch-Based Encoder

Figure 8:
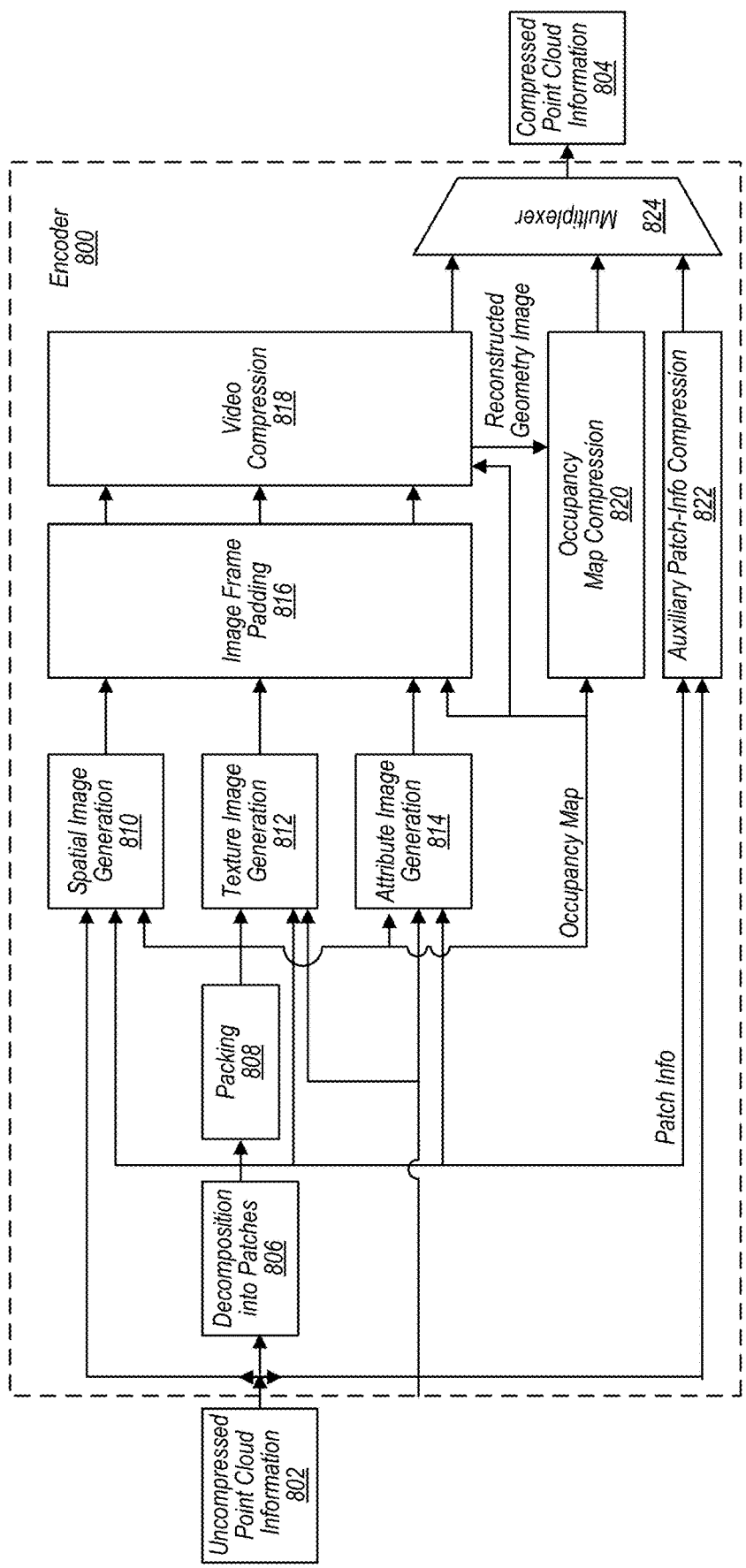
FIG. 8 illustrates components of an encoder for encoding point cloud frames, according to some embodiments.

FIG. 8 illustrates components of an encoder for encoding sub-point cloud frames, according to some embodiments. The encoder 800 receives uncompressed point cloud (or sub-point cloud) 802 and generates compressed point cloud information 804. In some embodiments, an encoder, such as encoder 800, may receive the uncompressed point cloud 802 from a sensor or, in some embodiments, may receive the uncompressed point cloud 802 from another source, such as a graphics generation component that generates the uncompressed point cloud in software, as an example. In some embodiments, the uncompressed point cloud 802 may be a sub-point cloud received from a point cloud segmentation based on viewing area module.

In some embodiments, an encoder, such as encoder 800, includes decomposition into patches module 806, packing module 808, spatial image generation module 810, texture image generation module 812, and attribute information generation module 814. In some embodiments, an encoder, such as encoder 800, also includes image frame padding module 816, video compression module 818 and multiplexer 824. In addition, in some embodiments an encoder, such as encoder 800, may include an occupancy map compression module, such as occupancy map compression module 820, and an auxiliary patch information compression module, such as auxiliary patch information compression module 822. In some embodiments, an encoder, such as encoder 800, converts a 3D point cloud into an image-based representation along with some meta data (e.g., occupancy map and patch info) necessary to convert the compressed point cloud back into a decompressed point cloud.

In some embodiments, the conversion process decomposes the point cloud into a set of patches (e.g., a patch is defined as a contiguous subset of the surface described by the point cloud), which may be overlapping or not, such that each patch may be described by a depth field with respect to a plane in 2D space. More details about the patch decomposition process are provided above with regard to FIGS. 10A-10C.

After or in conjunction with the patches being determined for the point cloud being compressed, a 2D sampling process is performed in planes associated with the patches. The 2D sampling process may be applied in order to approximate each patch with a uniformly sampled point cloud, which may be stored as a set of 2D patch images describing the geometry/texture/attributes of the point cloud at the patch location. The "Packing" module 808 may store the 2D patch images associated with the patches in a single (or multiple) 2D images, referred to herein as "image frames" or "video image frames." In some embodiments, a packing module, such as packing module 808, may pack the 2D patch images such that the packed 2D patch images do not overlap (even though an outer bounding box for one patch image may overlap an outer bounding box for another patch image). Also, the packing module may pack the 2D patch images in a way that minimizes non-used images pixels of the image frame.

In some embodiments, "Geometry/Texture/Attribute generation" modules, such as modules 810, 812, and 814, generate 2D patch images associated with the geometry/texture/attributes, respectively, of the point cloud at a given patch location. As noted before, a packing process, such as performed by packing module 808, may leave some empty spaces between 2D patch images packed in an image frame. Also, a padding module, such as image frame padding module 816, may fill in such areas in order to generate an image frame that may be suited for 2D video and image codecs.

In some embodiments, an occupancy map (e.g., binary information describing for each pixel or block of pixels whether the pixel or block of pixels are padded or not) may be generated and compressed, for example by occupancy map compression module 820. The occupancy map may be sent to a decoder to enable the decoder to distinguish between padded and non-padded pixels of an image frame.

Note that other metadata associated with patches may also be sent to a decoder for use in the decompression process. For example, patch information indicating sizes and shapes of patches determined for the point cloud and packed in an image frame may be generated and/or encoded by an auxiliary patch-information compression module, such as auxiliary patch-information compression module 822. Additionally, patch to viewing area mapping information may be included in the auxiliary information. In some embodiments one or more image frames may be encoded by a video encoder, such as video compression module 818. In some embodiments, a video encoder, such as video compression module 818, may operate in accordance with the High Efficiency Video Coding (HEVC) standard or other suitable video encoding standard. In some embodiments, encoded video images, encoded occupancy map information, and encoded auxiliary patch information may be multiplexed by a multiplexer, such as multiplexer 824, and provided to a recipient as compressed point cloud information, such as compressed point cloud information 804.

Example Patch-Based Decoder

Figure 9:
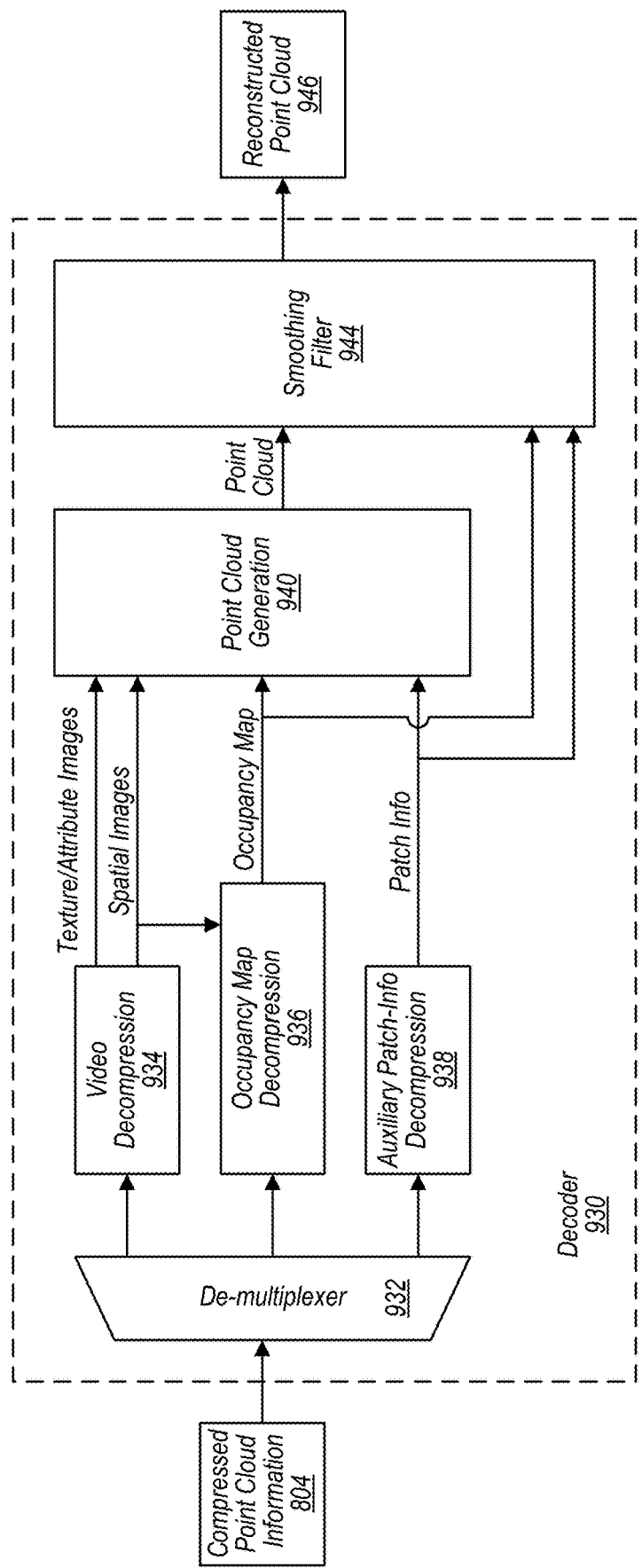
FIG. 9 illustrates components of a decoder for decoding point cloud frames, according to some embodiments.

FIG. 9 illustrates components of a decoder for decoding point cloud (or sub-point cloud) frames, according to some embodiments. Decoder 930 receives compressed point cloud information 804, which may be the same compressed point cloud information 804 generated by encoder 800. Decoder 930 generates reconstructed point cloud 946 based on receiving the compressed point cloud information 904.

In some embodiments, a decoder, such as decoder 930, includes a de-multiplexer 932, a video decompression module 934, an occupancy map decompression module 936, and an auxiliary patch-information decompression module 938. Additionally a decoder, such as decoder 930 includes a point cloud generation module 940, which reconstructs a point cloud based on patch images included in one or more image frames included in the received compressed point cloud information, such as compressed point cloud information 804. In some embodiments, a decoder, such as decoder 903, further comprises a smoothing filter, such as smoothing filter 944. In some embodiments, a smoothing filter may smooth incongruences at edges of patches, wherein data included in patch images for the patches has been used by the point cloud generation module to recreate a point cloud from the patch images for the patches. In some embodiments, a smoothing filter may be applied to the pixels located on the patch boundaries to alleviate the distortions that may be caused by the compression/decompression process.

Segmentation Process

Figure 10A:
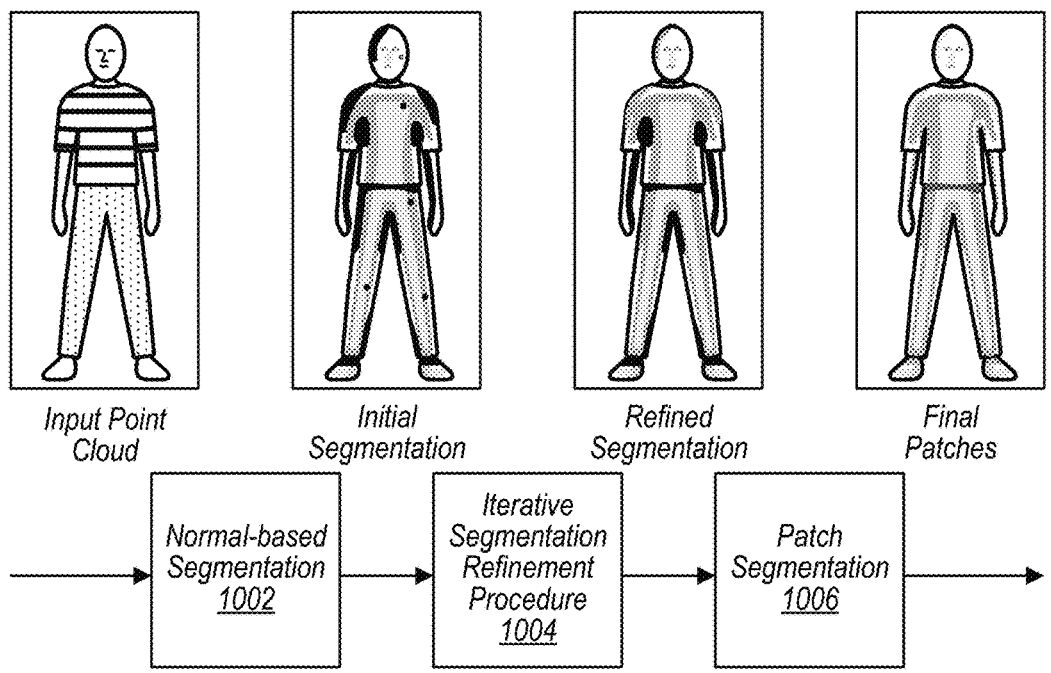
FIG. 10A illustrates an example patch segmentation process, according to some embodiments.

FIG. 10A illustrates an example segmentation process for determining patches for a point cloud, according to some embodiments. The segmentation process as described in FIG. 10A may be performed by a decomposition into patches module, such as decomposition into patches module 806. A segmentation process may decompose a point cloud into a minimum number of patches (e.g., a contiguous subset of the surface described by the point cloud), while making sure that the respective patches may be represented by a depth field with respect to a patch plane. This may be done without a significant loss of shape information. In some embodiments, a segmentation process as described in FIGS. 10A-10C may be performed taking into account viewing areas of a point cloud, wherein the segmentation process is performed for each viewing area to generate a set of patches corresponding to each of the viewing areas.

In some embodiments, a segmentation process comprises:
Letting point cloud PC be the input point cloud to be partitioned into patches and {P(0), P(1) . . . , P(N−1)} be the positions of points of point cloud PC.
In some embodiments, a fixed set D={D(0), D(1), . . . , D(K−1)} of K 3D orientations is pre-defined. For instance, D may be chosen as follows D={(1.0, 0.0, 0.0), (0.0, 1.0, 0.0), (0.0, 0.0, 1.0), (−1.0, 0.0, 0.0), (0.0, −1.0, 0.0), (0.0, 0.0, −1.0)}
In some embodiments, the normal vector to the surface at every point P(i) is estimated. Any suitable algorithm may be used to determine the normal vector to the surface. For instance, a technique could include fetching the set H of the "N" nearest points of P(i), and fitting a plane Π(i) to H(i) by using principal component analysis techniques. The normal to P(i) may be estimated by taking the normal V(i) to H(i). Note that "N" may be a user-defined parameter or may be found by applying an optimization procedure. "N" may also be fixed or adaptive. The normal values may then be oriented consistently by using a minimum-spanning tree approach.

Normal-based Segmentation: At 1002, an initial segmentation S0 of the points of point cloud PC may be obtained by associating respective points with the direction D(k) which maximizes the score $\langle \nabla(i) | D(k) \rangle$, where $\langle .|. \rangle$ is the canonical dot product of R3.

Iterative segmentation refinement: At 1004, an iterative segmentation refinement process may be performed. Note that segmentation S0 associates respective points with the plane Π(i) that best preserves the geometry of its neighborhood (e.g. the neighborhood of the segment). In some circumstances, segmentation S0 may generate too many small connected components with irregular boundaries, which may result in poor compression performance. In order to avoid such issues, the following iterative segmentation refinement procedure may be applied:
1. An adjacency graph A may be built by associating a vertex V(i) to respective points P(i) of point cloud PC and by adding R edges {E(i,j(0)), . . . , EN(R−1)} connecting vertex V(i) to its nearest neighbors {V(j(0)), V(j(1)), . . . , V(j(R−1))}. More precisely, {V(j(0)), V(j(1)), . . . , V(j(R−1))} may be the vertices associated with the points {P(j(0)), P(j(1)), . . . , P(j(R−1))}, which may be the nearest neighbors of P(i). Note that R may be a user-defined parameter or may be found by applying an optimization procedure. It may also be fixed or adaptive.
2. At each iteration, the points of point cloud PC may be traversed and every vertex may be associated with the direction D(k) that maximizes $\langle (\nabla(i) | D(k) \rangle + \lambda / R |\zeta(i)|)$, where $|\zeta(i)|$ is the number of the R-nearest neighbors of V(i) belonging to the same cluster and λ is a parameter controlling the regularity of the produced patches. Note that the parameters λ and R may be defined by the user or may be determined by applying an optimization procedure. They may also be fixed or adaptive. In some embodiments, a "user" as referred to herein may be an engineer who configured a point cloud compression technique as described herein to one or more applications.

Patch segmentation: In some embodiments, the patch segmentation procedure 1006 further segments the clusters detected in the previous steps into patches, which may be represented with a depth field with respect to a projection plane. The approach proceeds as follows, according to some embodiments:
1. First, a cluster-based adjacency graph with a number of neighbors R' is built, while considering as neighbors only the points that belong to the same cluster. Note that R' may be different from the number of neighbors R used in the previous steps.
2. Next, the different connected components of the cluster-based adjacency graph are extracted. Only connected components with a number of points higher than a parameter α are considered. Let CC={CC(0), CC(1), . . . , CC(M−1)} be the set of the extracted connected components.
3. Respective connected component CC(m) inherits the orientation D(m) of the cluster it belongs to. The points of CC(m) are then projected on a projection plane having as normal the orientation D(m), while updating a depth map, which records for every pixel the depth of the nearest point to the projection plane.
4. An approximated version of CC(m), denoted CC'(m), is then built by associating respective updated pixels of the depth map with a 3D point having the same depth. Let PC' be the point cloud obtained by the union of reconstructed connected components {CC' (0), CC' (1), . . . , CC'(M−1)}
5. Note that the projection reconstruction process may be lossy and some points may be missing. In order, to detect such points, every point P(i) of point cloud PC may be checked to make sure it is within a distance lower than a parameter δ from a point of PC'. If this is not the case, then P(i) may be marked as a missed point and added to a set of missed points denoted MP.
6. The steps 2-5 are then applied to the missed points MP. The process is repeated until MP is empty or CC is empty. Note that the parameters δ and α may be defined by the user or may be determined by applying an optimization procedure. They may also be fixed or adaptive.
7. A filtering procedure may be applied to the detected patches in order to make them better suited for compression. Example filter procedures may include:
   a. A smoothing filter based on the geometry/texture/attributes of the points of the patches (e.g., median filtering), which takes into account both spatial and temporal aspects.
   b. Discarding small and isolated patches.
   c. User-guided filtering.
   d. Other suitable smoothing filter techniques.

Packing

In some embodiments, depth maps associated with patches, also referred to herein as "depth patch images" or "geometry patch images," such as those described above, may be packed into a 2D image frame. For example, a packing module, such as packing module 808, may pack depth patch images generated by a spatial image generation module, such as spatial image generation module 810. The depth maps, or depth patch images, may be packed such that (A) no non-overlapping block of T×T pixels contains depth information from two different patches and such that (B) a size of the generated image frame is minimized.

In some embodiments, packing comprises the following steps:
a. The patches are sorted by height and then by width. The patches are then inserted in image frame (I) one after the other in that order. At each step, the pixels of image frame (I) are traversed in raster order, while checking if the current patch could be inserted under the two conditions (A) and (B) described above. If it is not possible then the height of (I) is doubled.

b. This process is iterated until all the patches are inserted.

In some embodiments, the packing process described above may be applied to pack a subset of the patches inside multiples tiles of an image frame or multiple image frames. This may allow patches with similar/close orientations based on visibility according to the rendering camera position to be stored in the same image frame/tile, to enable view-dependent streaming and/or decoding. This may also allow parallel encoding/decoding.

In some embodiments, the packing process can be considered a bin-packing problem and a first decreasing strategy as described above may be applied to solve the bin-packing problem. In other embodiments, other methods such as the modified first fit decreasing (MFFD) strategy may be applied in the packing process.

Figure 10B:
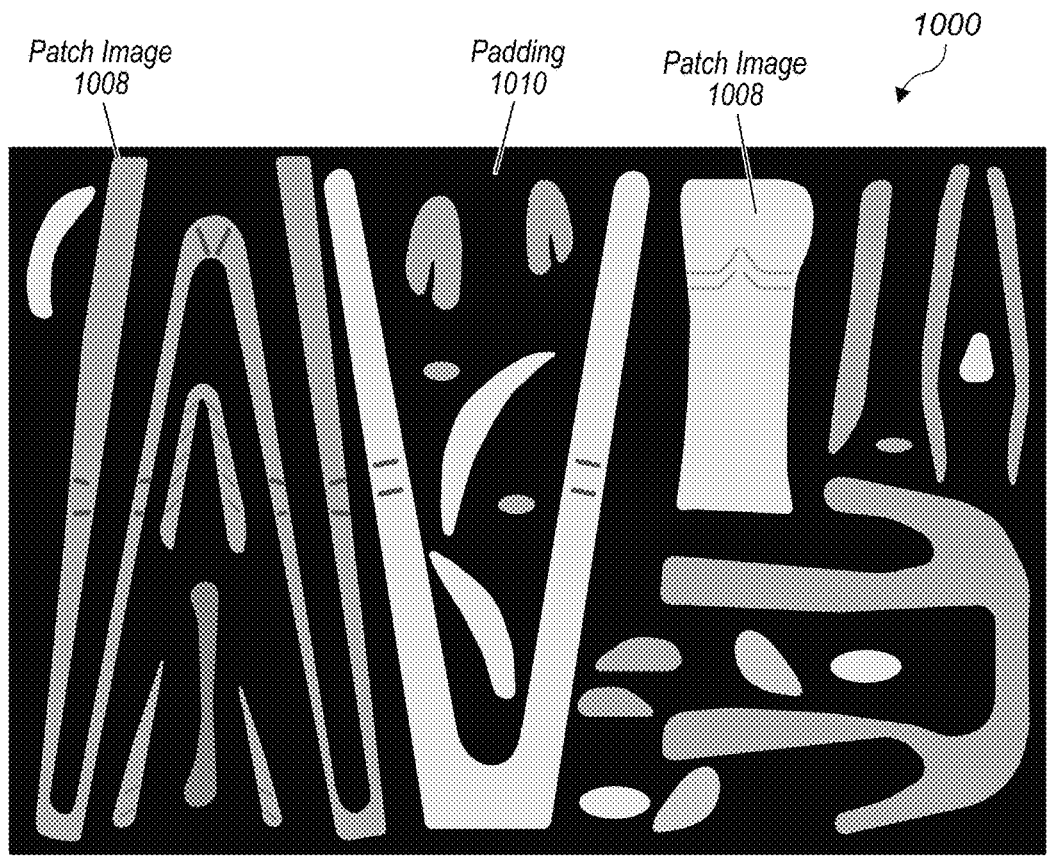
FIG. 10B illustrates an example image frame comprising packed patch images and padded portions, according to some embodiments.

FIG. 10B illustrates an example image frame comprising packed patch images and padded portions, according to some embodiments. Image frame 1000 includes patch images 1008 packed into image frame 1000 and also includes padding 1010 in space of image frame 1000 not occupied by patch images. In some embodiments, padding, such as padding 1010, may be determined so as to minimize incongruences between a patch image and the padding. For example, in some embodiments, padding may construct new pixel blocks that are replicas of, or are to some degree similar to, pixel blocks that are on the edges of patch images. Because an image and/or video encoder may encode based on differences between adjacent pixels, such an approach may reduce the number of bytes required to encode an image frame comprising of patch images and padding, in some embodiments.

In some embodiments, the patch information may be stored in the same order as the order used during the packing, which makes it possible to handle overlapping 2D bounding boxes of patches. Thus a decoder receiving the patch information can extract patch images from the image frame in the same order in which the patch images were packed into the image frame. Also, because the order is known by the decoder, the decoder can resolve patch image bounding boxes that overlap.

Figure 10C:
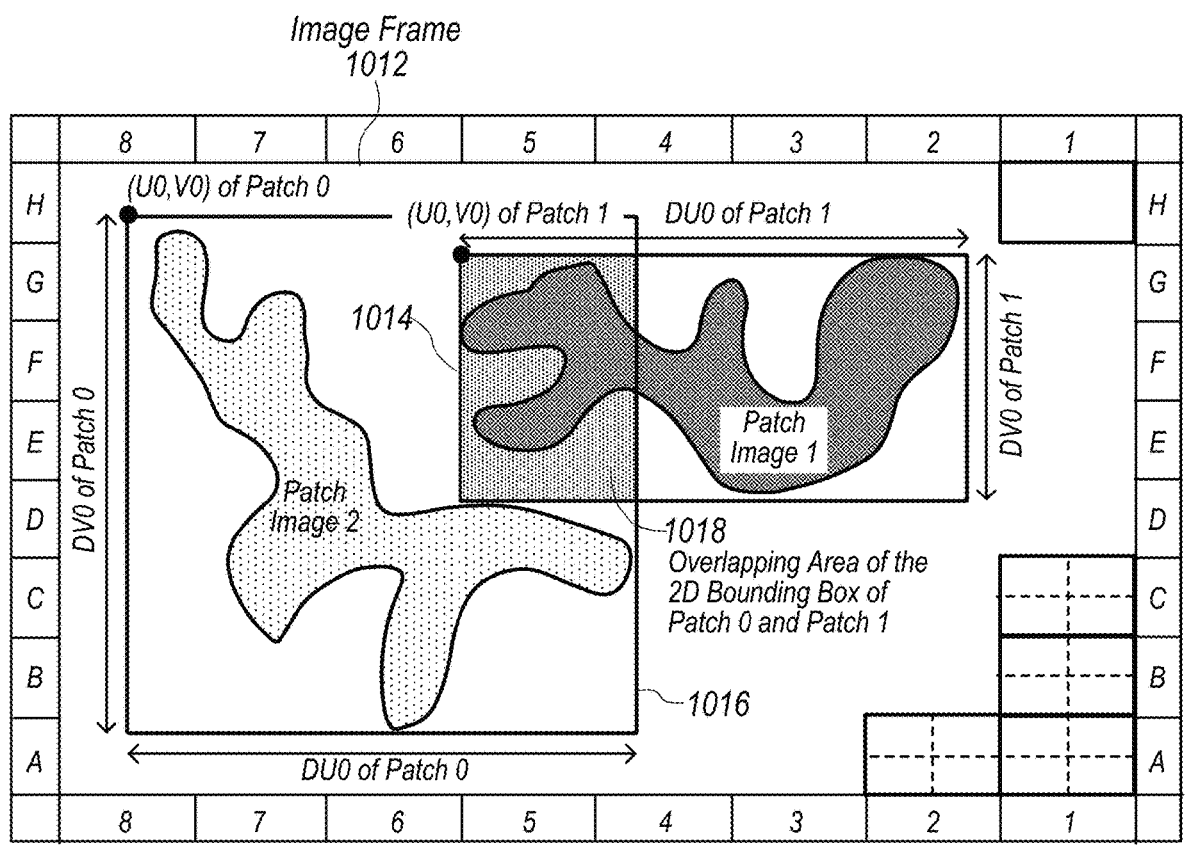
FIG. 10C illustrates an example image frame comprising patch portions and padded portions, according to some embodiments.

FIG. 10C illustrates an example image frame 1012 with overlapping patches, according to some embodiments. FIG. 10C shows an example with two patches (patch image 1 and patch image 2) having overlapping 2D bounding boxes 1014 and 1016 that overlap at area 1018. In order to determine to which patch the T×T blocks in the area 1018 belong, the order of the patches may be considered. For example, the T×T block 1014 may belong to the last decoded patch. This may be because in the case of an overlapping patch, a later placed patch is placed such that it overlaps with a previously placed patch. By knowing the placement order it can be resolved that areas of overlapping bounding boxes go with the latest placed patch. In some embodiments, the patch information is predicted and encoded (e.g., with an entropy/arithmetic encoder). Also, in some embodiments, U0, V0, DU0 and DV0 are encoded as multiples of T, where T is the block size used during the padding phase.

FIG. 10C also illustrates blocks of an image frame 1012, wherein the blocks may be further divided into sub-blocks. For example block A1, B1, C1, A2, etc. may be divided into multiple sub-blocks, and, in some embodiments, the sub-blocks may be further divided into smaller blocks. In some embodiments, a video compression module of an encoder, such as video compression module 818, may determine whether a block comprises active pixels, non-active pixels, or a mix of active and non-active pixels. The video compression module may budget fewer resources to compress blocks comprising non-active pixels than an amount of resources that are budgeted for encoding blocks comprising active pixels. In some embodiments, active pixels may be pixels that include data for a patch image and non-active pixels may be pixels that include padding. In some embodiments, a video compression module may sub-divide blocks comprising both active and non-active pixels, and budget resources based on whether sub-blocks of the blocks comprise active or non-active pixels. For example, blocks A1, B1, C1, A2 may comprise non-active pixels. As another example block E3 may comprise active pixels, and block B6, as an example, may include a mix of active and non-active pixels.

Example Geometry-Based Encoding Techniques

Figure 11:
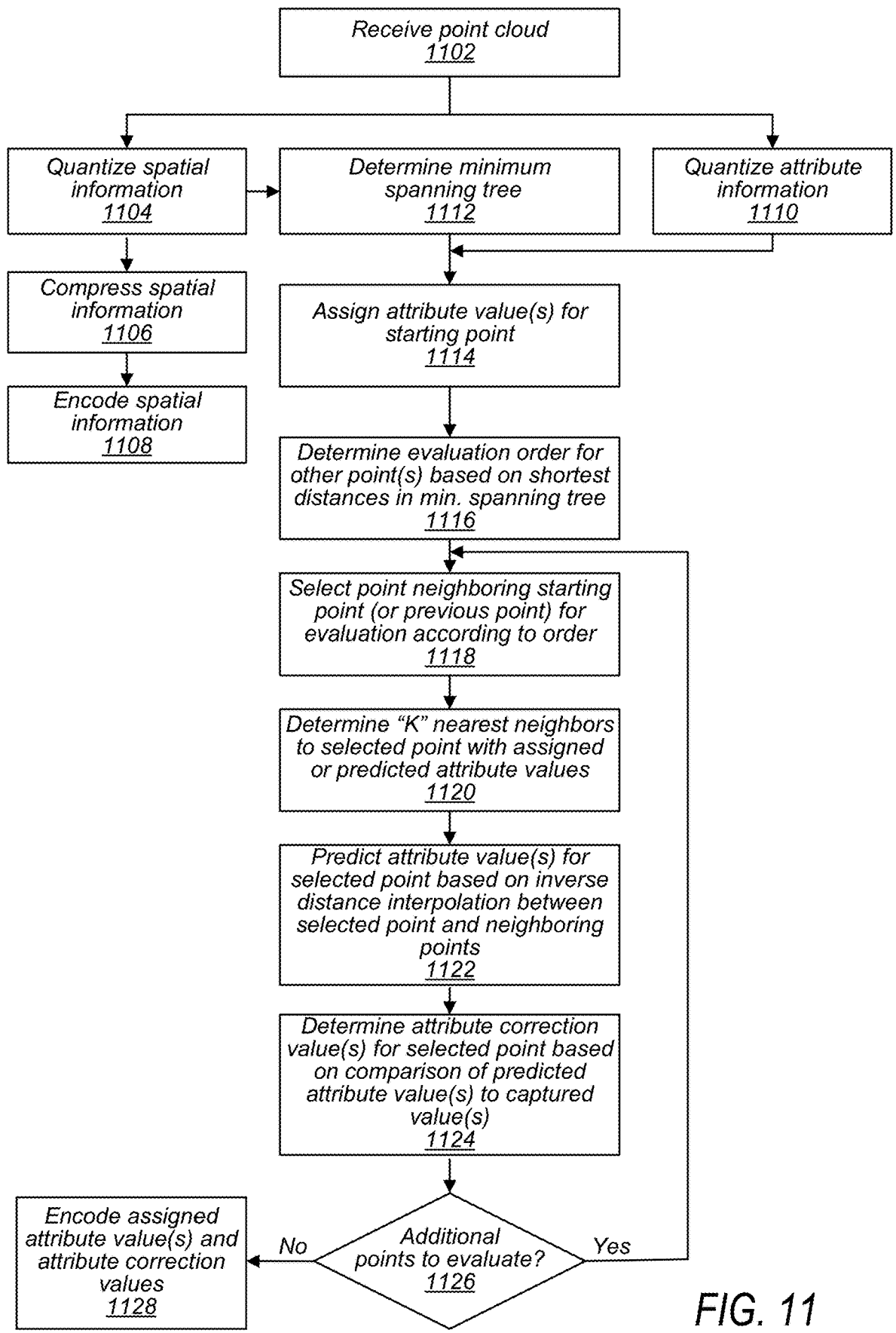
FIG. 11 illustrates a process for compressing attribute information of a sub-point cloud using geometry based compression techniques, according to some embodiments.

FIG. 11 illustrates a process for compressing attribute information of a point sub-point cloud using a geometry based encoding technique, according to some embodiments.

At block 1102, an encoder receives a sub-point cloud that includes attribute information for at least some of the points of the point cloud. The sub-point cloud may be received from a segmentation based on viewing area module, or the sub-point cloud may be generated in software. For example, a virtual reality or augmented reality system may have generated the point cloud.

At block 1104, the spatial information of the sub-point cloud, for example X, Y, and Z coordinates for the points of the sub-point cloud may be quantized. In some embodiments, coordinates may be rounded off to the nearest measurement unit, such as a meter, centimeter, millimeter, etc.

At block 1106, the quantized spatial information is compressed. In some embodiments, spatial information may be compressed using a sub-sampling and subdivision prediction technique as discussed in more detail in regard to FIGS. 12A-B. Also, in some embodiments, spatial information may be compressed using a K-D tree compression technique as discussed in more detail in regard to FIG. 13, or may be compressed using an Octree compression technique. In some embodiments, other suitable compression techniques may be used to compress spatial information of a point cloud.

At block 1108, the compressed spatial information for the sub-point cloud is encoded as a compressed sub-point cloud file or a portion of a compressed sub-point cloud file. In some embodiments, compressed spatial information and compressed attribute information may be included in a common compressed sub-point cloud file, or may be communicated or stored as separate files.

At block 1112, the received spatial information of the sub-point cloud is used to generate a minimum spanning tree. In some embodiments, the spatial information of the sub-point cloud may be quantized before generating the minimum spanning tree. Additionally, in some embodiments wherein a lossy compression technique is used to compress the spatial information of the sub-point cloud, the spatial information may be lossy encoded and lossy decoded prior to generating the minimum spanning tree. In embodiments that utilize lossy compression for spatial information, encoding and decoding the spatial information at the encoder may ensure that a minimum spanning tree generated at the encoder will match a minimum spanning tree that will be generated at a decoder using decoded spatial information that was previously lossy encoded.

Additionally, in some embodiments, at 1110, attribute information for points of the sub-point cloud may be quantized. For example attribute values may be rounded to whole numbers or to particular measurement increments. In some embodiments wherein attribute values are integers, such as when integers are used to communicate string values, such as "walking", "running", "driving", etc., quantization at 1110 may be omitted.

At 1114, attribute values for a starting point are assigned. The assigned attribute values for the starting point are encoded in a compressed attribute information file along with attribute correction values. Because a decoder may predict attribute values based on distances to neighboring points and attribute values of neighboring points, at least one attribute value for at least one point is explicitly encoded in a compressed attribute file. In some embodiments, points of a sub-point cloud may comprise multiple attributes and at least one attribute value for each type of attribute may be encoded for at least one point of the sub-point cloud, in such embodiments. In some embodiments, a starting point may be a first point evaluated when determining the minimum spanning tree at 1112. In some embodiments, an encoder may encode data indicating spatial information for a starting point and/or other indicia of which point of the sub-point cloud is the starting point or starting points. Additionally, the encoder may encode attribute values for one or more attributes of the starting point.

At 1116, the encoder determines an evaluation order for predicting attribute values for other points of the sub-point cloud, other than the starting point, said predicting and determining attribute correction values, may be referred to herein as "evaluating" attributes of a point. The evaluation order may be determined based on a shortest distance from the starting point to an adjacent neighboring point, wherein the closest neighboring point is selected as the next point in the evaluation order. In some embodiments, an evaluation order may be determined only for a next point to evaluate. In other embodiments, an evaluation order for all or multiple ones of the points of the sub-point cloud may be determined at 1116. In some embodiments, an evaluation order may be determined on the fly, e.g. one point at a time as the points are evaluated.

At 1118, a neighboring point of the starting point or of a subsequent point being evaluated is selected. In some embodiments, a neighboring point to be next evaluated may be selected based on the neighboring point being at a shortest distance from a point last evaluated, as compared to other neighboring points of the point last evaluated. In some embodiments, a point selected at 1118 may be selected based on an evaluation order determined at 1116. In some embodiments, an evaluation order may be determined on the fly, e.g. one point at a time as the points are evaluated. For example, a next point in the evaluation order may be determined each time a next point to be evaluated is selected at 1118. In such embodiments, 1116 may be omitted. Because points are evaluated in an order wherein each next point to be evaluated is at a shortest distance from a point last evaluated, entropy between attribute values of the points being evaluated may be minimized. This is because points adjacent to one another are most likely to have similar attributes. Though in some circumstances, adjacent points may have varying levels of similarity between attributes.

At 1120, the "K" nearest neighboring points to the point currently being evaluated are determined. The parameter "K" may be a configurable parameter selected by an encoder or provided to an encoder as a user configurable parameter. In order to select the "K" nearest neighboring points, an encoder may identify the first "K" nearest points to a point being evaluated according to the minimum spanning tree determined at 1112. In some embodiments, only points having assigned attribute values or for which predicted attribute values have already been determined may be included in the "K" nearest neighboring points. In some embodiments various numbers of points may identified. For example, in some embodiments, "K" may be 5 points, 10 points, 16 points, etc. Because a point cloud comprises points in 3-D space a particular point may have multiple neighboring points in multiple planes. In some embodiments, an encoder and a decoder may be configured to identify points as the "K" nearest neighboring points regardless of whether or not a value has already been predicted for the point. Also, in some embodiments, attribute values for points used in predication may be previously predicted attribute values or corrected predicted attribute values that have been corrected based on applying an attribute correction value. In either case, an encoder and a decoder may be configured to apply the same rules when identifying the "K" nearest neighboring points and when predicting an attribute value of a point based on attribute values of the "K" nearest neighboring points.

At 1122, one or more attribute values are determined for each attribute of the point currently being evaluated. The attribute values may be determined based on an inverse distance interpolation. The inverse distance interpolation may interpolate the predicted attribute value based on the attribute values of the "K" nearest neighboring points. The attribute values of the "K" nearest neighboring points may be weighted based on respective distances between respective ones of the "K" nearest neighboring points and the point being evaluated. Attribute values of neighboring points that are at shorter distances from the point currently being evaluated may be weighted more heavily than attribute values of neighboring points that are at greater distances from the point currently being evaluated.

At 1124, attribute correction values are determined for the one or more predicted attribute values for the point currently being evaluated. The attribute correction values may be determined based on comparing the predicted attribute values to corresponding attribute values for the same point (or a similar point) in the sub-point cloud prior to attribute information compression. In some embodiments, quantized attribute information, such as the quantized attribute information generated at 1110, may be used to determine attribute correction values. In some embodiments, an attribute correction value may also be referred to as a "residual error" wherein the residual error indicates a difference between a predicted attribute value and an actual attribute value.

At 1126, it is determined if there are additional points in the sub-point cloud for which attribute correction values are to be determined. If there are additional points to evaluate, the process reverts to 1118 and the next point in the evaluation order is selected to be evaluated. As discussed above, in some embodiments an evaluation order may be determined on the fly, e.g. one point at a time as the points are evaluated. Thus, in such embodiments, a minimum spanning tree may be consulted to select a next point to evaluate based on the next point being at the shortest distance from the point last evaluated. The process may repeat steps 1118-1126 until all or a portion of all of the points of the sub-point cloud have been evaluated to determine predicted attribute values and attribute correction values for the predicted attribute values.

At 1128, the determined attribute correction values, the assigned attribute values, and any configuration information for decoding the compressed attribute information file, such as a parameter "K", is encoded.

Example Processes for Encoding Spatial Information

Figures 12A, 12B:
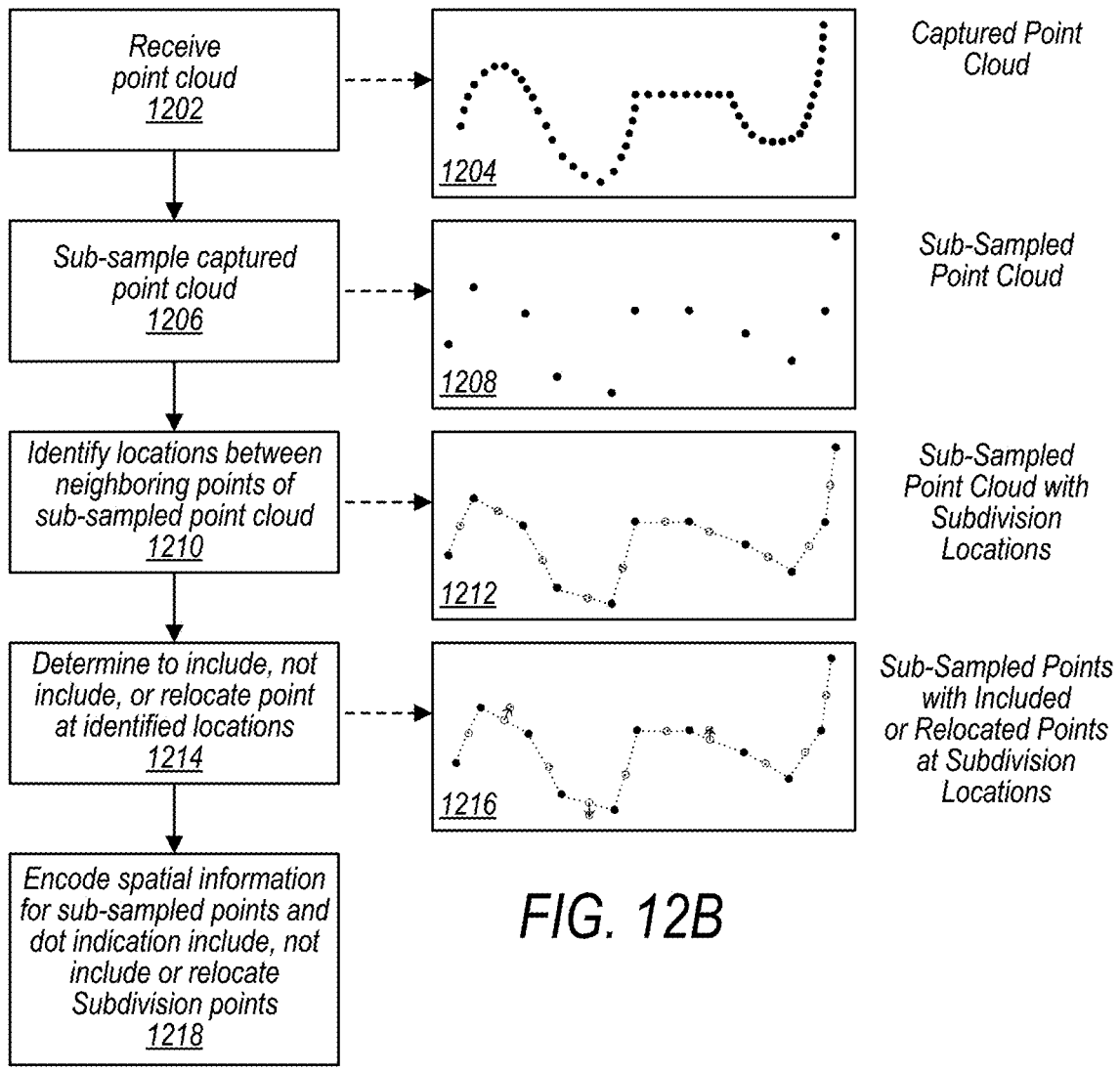
FIGS. 12A-12B illustrate an example process for compressing geometry information of a sub-point cloud using a geometry based compression technique, according to some embodiments.

FIGS. 12A-B illustrate an example process for compressing spatial information of a sub-point cloud, according to some embodiments. At block 1202, an encoder receives a sub-point cloud. For example, illustration 1204 illustrates points of an un-compressed sub-point cloud. At block 1206, the encoder sub-samples the received sub-point cloud to generate a sub-sampled sub-point cloud. The sub-sampled sub-point cloud may include fewer points than the received sub-point cloud. For example, the received sub-point cloud may include hundreds of points, thousands of points, or millions of points and the sub-sampled sub-point cloud may include tens of points, hundreds of points or thousands of points. For example, illustration 1208 illustrates sub-sampled points of a sub-point cloud received at block 1202, for example a sub-sampling of the points of the sub-point cloud in illustration 1204.

In some embodiments, the encoder may encode and decode the sub-sampled sub-point cloud to generate a representative sub-sampled sub-point cloud the decoder will encounter when decoding the compressed sub-point cloud. In some embodiments, the encoder and decoder may execute a lossy compression/decompression algorithm to generate the representative sub-sampled sub-point cloud. In some embodiments, spatial information for points of a sub-sampled sub-point cloud may be quantized as part of generating a representative sub-sampled point cloud. In some embodiments, an encoder may utilize lossless compression techniques and encoding and decoding the sub-sampled sub-point cloud may be omitted. For example, when using lossless compression techniques the original sub-sampled sub-point cloud may be representative of a sub-sampled sub-point cloud the decoder will encounter because in lossless compression data may not be lost during compression and decompression.

At block 1210, the encoder identifies subdivision locations between points of the sub-sampled sub-point cloud according to configuration parameters selected for compression of the point cloud or according to fixed configuration parameters. The configuration parameters used by the encoder that are not fixed configuration parameters are communicated to an encoder by including values for the configuration parameters in a compressed sub-point cloud. Thus, a decoder may determine the same subdivision locations as the encoder evaluated based on subdivision configuration parameters included in the compressed sub-point cloud. For example, illustration 1212 illustrates identified subdivision locations between neighboring points of a sub-sampled sub-point cloud.

At block 1214, the encoder determines for respective ones of the subdivision locations whether a point is to be included or not included at the subdivision location in a decompressed sub-point cloud. Data indicating this determination is encoded in the compressed sub-point cloud. In some embodiments, the data indicating this determination may be a single bit that if "true" means a point is to be included and if "false" means a point is not to be included. Additionally, an encoder may determine that a point that is to be included in a decompressed sub-point cloud is to be relocated relative to the subdivision location in the decompressed sub-point cloud. For example, illustration 1216, shows some points that are to be relocated relative to a subdivision location. For such points, the encoder may further encode data indicating how to relocate the point relative to the subdivision location. In some embodiments, location correction information may be quantized and entropy encoded. In some embodiments, the location correction information may comprise delta X, delta Y, and/or delta Z values indicating how the point is to be relocated relative to the subdivision location. In other embodiments, the location correction information may comprise a single scalar value which corresponds to the normal component of the location correction information computed as follows:

$$\Delta N = ([X_A, Y_A, Z_A] - [X, Y, Z]) \cdot [\text{Normal Vector}]$$

In the above equation, delta N is a scalar value indicating location correction information that is the difference between the relocated or adjusted point location relative to the subdivision location (e.g. $[X_A, Y_A, Z_A]$) and the original subdivision location (e.g. $[X, Y, Z]$). The cross product of this vector difference and the normal vector at the subdivision location results in the scalar value delta N. Because a decoder can determine, the normal vector at the subdivision location, and can determine the coordinates of the subdivision location, e.g. $[X, Y, Z]$, the decoder can also determine the coordinates of the adjusted location, e.g. $[X_A, Y_A, Z_A]$, by solving the above equation for the adjusted location, which represents a relocated location for a point relative to the subdivision location. In some embodiments, the location correction information may be further decomposed into a normal component and one or more additional tangential components. In such an embodiment, the normal component, e.g. delta N, and the tangential component(s) may be quantized and encoded for inclusion in a compressed point cloud.

In some embodiments, an encoder may determine whether one or more additional points (in addition to points included at subdivision locations or points included at locations relocated relative to subdivision locations) are to be included in a decompressed sub-point cloud. For example, if the original sub-point cloud has an irregular surface or shape such that subdivision locations between points in the sub-sampled sub-point cloud do not adequately represent the irregular surface or shape, the encoder may determine to include one or more additional points in addition to points determined to be included at subdivision locations or relocated relative to subdivision locations in the decompressed sub-point cloud. Additionally, an encoder may determine whether one or more additional points are to be included in a decompressed sub-point cloud based on system constraints, such as a target bitrate, a target compression ratio, a quality target metric, etc. In some embodiments, a bit budget may change due to changing conditions such as network conditions, processor load, etc. In such embodiments, an encoder may adjust a quantity of additional points that are encoded to be included in a decompressed sub-point cloud based on a changing bit budget. In some embodiments, an encoder may include additional points such that a bit budget is consumed without being exceeded. For example, when a bit budget is higher, an encoder may include more additional points to consume the bit budget (and enhance quality) and when the bit budget is less, the encoder may include fewer additional points such that the bit budget is consumed but not exceeded.

In some embodiments, an encoder may further determine whether additional subdivision iterations are to be performed. If so, the points determined to be included, relocated, or additionally included in a decompressed point cloud are taken into account and the process reverts to block 1210 to identify new subdivision locations of an updated sub-sampled point cloud that includes the points determined to be included, relocated, or additionally included in the decompressed point cloud. In some embodiments, a number of subdivision iterations to be performed (N) may be a fixed or configurable parameter of an encoder. In some embodiments, different subdivision iteration values may be assigned to different portions of a point cloud. For example, an encoder may take into account a point of view from which the point cloud is being viewed and may perform more subdivision iterations on points of the point cloud in the foreground of the point cloud as viewed from the point of view and fewer subdivision iterations on points in a background of the point cloud as viewed from the point of view.

At block 1218, the spatial information for the sub-sampled points of the sub-point cloud are encoded. Additionally, subdivision location inclusion and relocation data is encoded. Additionally, any configurable parameters selected by the encoder or provided to the encoder from a user are encoded. The compressed point cloud may then be sent to a receiving entity as a compressed point cloud file, multiple compressed point cloud files, or may be packetized and communicated via multiple packets to a receiving entity, such as a decoder or a storage device. In some embodiments, a compressed sub-point cloud may comprise both compressed spatial information and compressed attribute information. In other embodiments, compressed spatial information and compressed attribute information may be included is separate compressed point cloud files.

Figure 13:
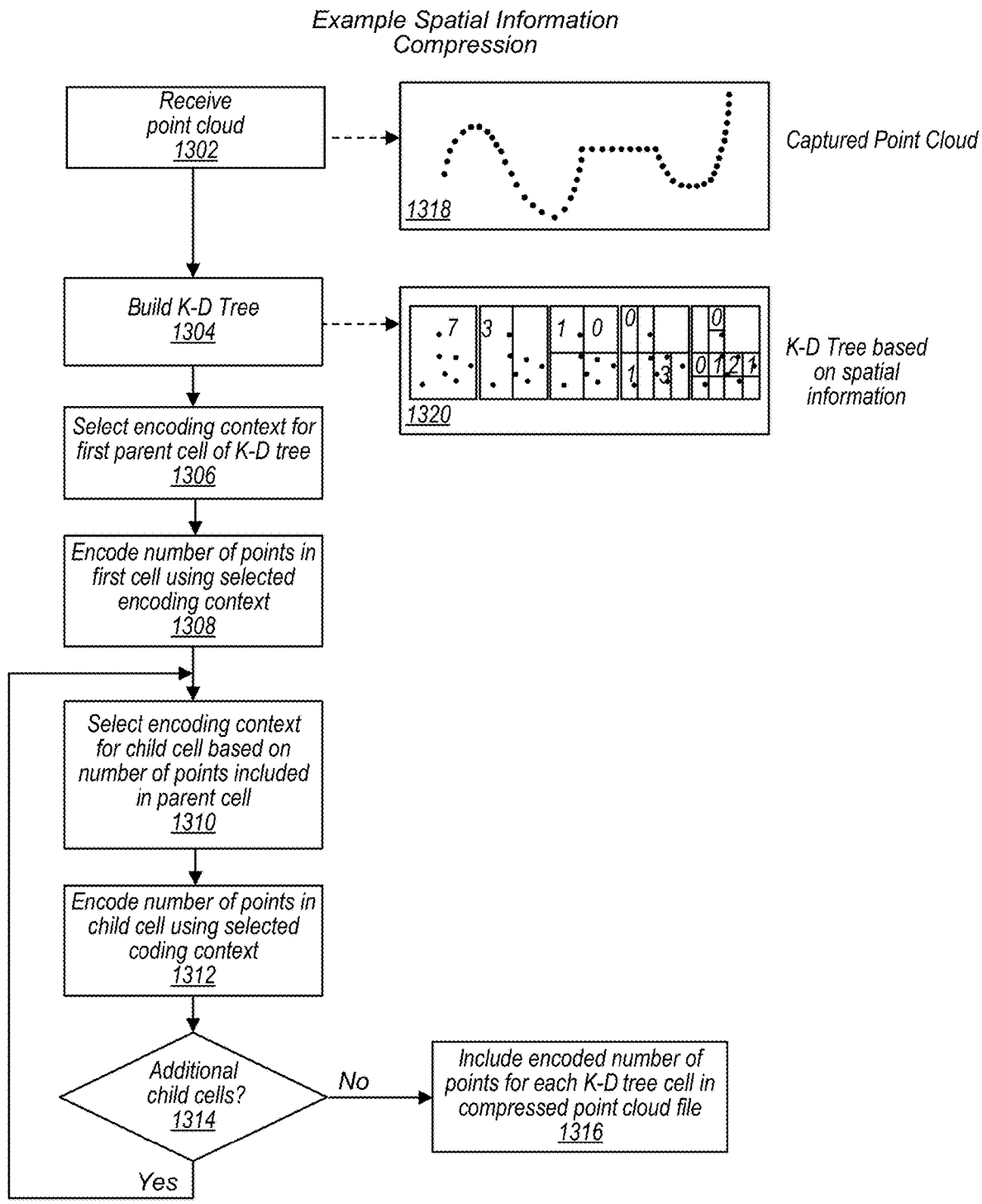
FIG. 13 illustrates another example process for compressing geometry information of a sub-point cloud using a geometry based compression technique, according to some embodiments.

FIG. 13 illustrates another example process for compressing spatial information of a point cloud, according to some embodiments.

In some embodiments, other spatial information compression techniques other than the sub-sampling and prediction spatial information technique described in FIGS. 12A-B may be used. For example, a spatial encoder, may utilize other spatial information compression techniques, such as a K-D tree spatial information compression technique. For example, compressing spatial information at block 1106 of FIG. 11 may be performed using a sub-sampling and prediction technique similar to what is described in FIGS. 12A-B, may be performed using a K-D tree spatial information compression technique similar to what is described in FIG. 13, or may be performed using another suitable spatial information compression technique.

In a K-D tree spatial information compression technique, a sub-point cloud comprising spatial information may be received at 1302. In some embodiments, the spatial information may have been previously quantized or may further be quantized after being received. For example, illustration 1318 illustrates a sub-point cloud that may be received at block 1302. For simplicity, illustration 1318 illustrates a sub-point cloud in two dimensions. However, in some embodiments, a received point cloud may include points in 3-D space.

At block 1304, a K-dimensional tree or K-D tree is built using the spatial information of the received sub-point cloud. In some embodiments, a K-D tree may be built by dividing a space, such as a 1-D, 2-D, or 3-D space of a sub-point cloud in half in a predetermined order. For example, a 3-D space comprising points of a point cloud may initially be divided in half via a plane intersecting one of the three axis, such as the X-axis. A subsequent division may then divide the resulting space along another one of the three axis, such as the Y-axis. Another division may then divide the resulting space along another one of the axis, such as the Z-axis. Each time a division is performed a number of points included in a child cell created by the division may be recorded. In some embodiments, only a number of points in one child cell of two child cells resulting from a division may be recorded. This is because a number of points included in the other child cell can be determined by subtracting the number of points in the recorded child cell from a total number of points in a parent cell prior to the division.

A K-D tree may include a sequence of number of points included in cells resulting from sequential divisions of a space comprising points of a point cloud. In some embodiments, building a K-D tree may comprise continuing to subdivide a space until only a single point is included in each lowest level child cell. A K-D tree may be communicated as a sequence of number of points in sequential cells resulting from sequential divisions. A decoder may be configured with information indicating the subdivision sequence followed by an encoder. For example, an encoder may follow a pre-defined division sequence until only a single point remains in each lowest level child cell. Because the decoder may know the division sequence that was followed to build the K-D tree and the number of points that resulted from each subdivision (which is communicated to the decoder as compressed spatial information) the decoder may be able to reconstruct the point cloud.

For example, illustration 1320 illustrates a simplified example of K-D compression in a two-dimensional space. An initial space includes seven points. This may be considered a first parent cell and a K-D tree may be encoded with a number of points "7" as a first number of the K-D tree indicating that there are seven total points in the K-D tree. A next step may be to divide the space along the X-axis resulting in two child cells, a left child cell with three points and a right child cell with four points. The K-D tree may include the number of points in the left child cell, for example "3" as a next number of the K-D tree. Recall that the number of points in the right child cell can be determined based on subtracting the number of points in the left child cell from the number of points in the parent cell. A further step may be to divide the space an additional time along the Y-axis such that each of the left and right child cells are divided in half into lower level child cells. Again, a number of points included in the left lower-level child cells may be included in a K-D tree, for example "0" and "1". A next step may then be to divide the non-zero lower-level child cells along the X-axis and record the number of points in each of the lower-level left child cells in a K-D tree. This process may continue until only a single point remains in a lowest level child cell. A decoder may utilize a reverse process to recreate a point cloud based on receiving a sequence of point totals for each left child cell of a K-D tree.

At block 1306, an encoding context for encoding a number of points for a first cell of the K-D tree, for example the parent cell comprising seven points, is selected. In some embodiments, a context store may store hundreds or thousands of encoding contexts. In some embodiments, cells comprising more points than a highest number of points encoding context may be encoded using the highest number point encoding context. In some embodiments, an encoding context may include arithmetic encoding, Golomb exponential encoding, or a combination of the two. In some embodiments, other encoding techniques may be used. In some embodiments, an arithmetic encoding context may include probabilities for particular symbols, wherein different arithmetic encoding contexts include different symbol probabilities.

At block 1308, the number of points for the first cell is encoded according the selected encoding context. At block 1310, an encoding context for encoding a child cell is selected based on a number of points included in a parent cell. The encoding context for the child cell may be selected in a similar manner as for the parent cell at block 1306. At block 1312, the number of points included in the child cell is encoded according the selected encoding context, selected at block 1310. At block 1314, it is determined if there are additional lower-level child cells to encode in the K-D tree. If so, the process reverts to block 1310. If not, at block 1316, the encoded number of points in the parent cell and the child cells are included in a compressed spatial information file, such as a compressed point cloud. The encoded values are ordered in the compressed spatial information file such that the decoder may reconstruct the point cloud based on the number of points of each parent and child cell and the order in which the number of points of the respective cells are included in the compressed spatial information file.

In some embodiments, the number of points in each cell may be determined and subsequently encoded as a group at block 1316. Or, in some embodiments, a number of points in a cell may be encoded subsequent to being determined without waiting for all child cell point totals to be determined.

Example Geometry Based Decoding Process

Figure 14:
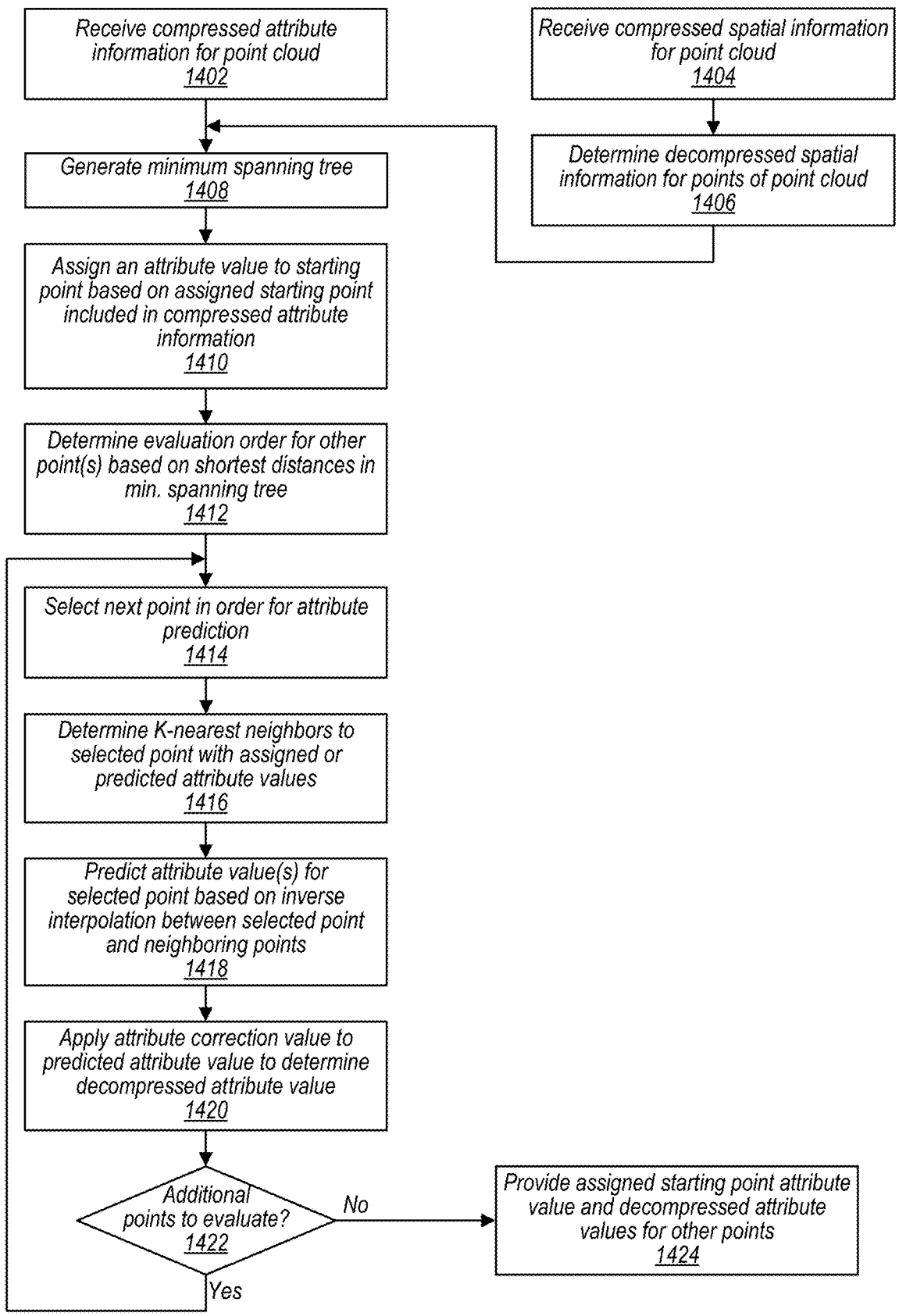
FIG. 14 illustrates an example process for decompressing compressed attribute information of a sub-point cloud that was compressed using a geometry based compression technique, according to some embodiments.

FIG. 14 illustrates an example process for decompressing compressed attribute information of a sub-point cloud, according to some embodiments. At block 1402, a decoder receives compressed attribute information for a sub-point cloud, and at block 1404, the decoder receives compressed spatial information for the sub-point cloud. In some embodiments, the compressed attribute information and the compressed spatial information may be included in one or more common files or separate files.

At block 1406, the decoder decompresses the compressed spatial information. The compressed spatial information may have been compressed according to a sub-sampling and prediction technique and the decoder may perform similar sub-sampling, prediction, and prediction correction actions as were performed at the encoder and further apply correction values to the predicted point locations, to generate a non-compressed sub-point cloud from the compressed spatial information. In some embodiments, the compressed spatial information may be compressed in a K-D tree format, and the decoder may generate a decompressed sub-point cloud based on an encoded K-D tree included in the received spatial information. In some embodiments, the compressed spatial information may have been compressed using an Octree technique and an Octree decoding technique may be used to generate decompressed spatial information for the sub-point cloud. In some embodiments, other spatial information compression techniques may have been used and may be decompressed via the decoder.

At block 1408, the decoder may generate a minimum spanning tree, based on the decompressed spatial information. A spatial decoder may decompress the compressed spatial information, and a minimum spanning tree generator may generate a minimum spanning tree based on the decompressed spatial information.

At block 1410, a prediction evaluator of a decoder may assign an attribute value to a starting point based on an assigned attribute value included in the compressed attribute information. In some embodiments, the compressed attribute information may identify a point as a starting point to be used for generating the minimum spanning tree and for predicting attribute values of the points according to an evaluation order based on the minimum spanning tree. The assigned attribute value or values for the starting point may be included in decompressed attribute information for a decompressed sub-point cloud.

At block 1412, the prediction evaluator of the decoder or another decoder component determines an evaluation order for at least the next point subsequent to the starting point that is to be evaluated. In some embodiments, an evaluation order may be determined for all or multiple ones of the points, or in other embodiments, an evaluation order may be determined point by point as attribute values are determined for the points. The points may be evaluated in an order based on minimum distances between successive points being evaluated. For example, a neighboring point at a shortest distance from a starting point as compared to other neighboring points may be selected as a next point to evaluate subsequent to the starting point. In a similar manner, other points may then be selected to be evaluated based on a shortest distance from a point that has most recently been evaluated. At 1414, the next point to evaluate is selected. In some embodiments 1412 and 814 may be performed together.

At block 1416, a prediction evaluator of a decoder determines the "K" nearest neighboring points to a point being evaluated. In some embodiments, neighboring points may only be included in the "K" nearest neighboring points if they already have assigned or predicted attribute values. In other embodiments, neighboring points may be included in the "K" nearest neighboring points without regard to whether they have assigned or already predicted attribute values. In such embodiments, an encoder may follow a similar rule as the decoder as to whether or not to include points without predicted values as neighboring points when identifying the "K" nearest neighboring points.

At block 1418, predicted attribute values are determined for one or more attributes of the point being evaluated based on attribute values of the "K" nearest neighboring points and distances between the point being evaluated and respective ones of the "K" nearest neighboring points. In some embodiments, an inverse distance interpolation technique may be used to predict attribute values, wherein attribute values of points closer to a point being evaluated are weighted more heavily than attribute values of points that are further away from the point being evaluated. The attribute prediction technique used by a decoder may be the same as an attribute prediction technique used by an encoder that compressed the attribute information.

At block 1420, a prediction evaluator of a decoder may apply an attribute correction value to a predicted attribute value of a point to correct the attribute value. The attribute correction value may cause the attribute value to match or nearly match an attribute value of an original point cloud prior to compression. In some embodiments, in which a point has more than one attribute, blocks 1418 and 1420 may be repeated for each attribute of the point. In some embodiments, some attribute information may be decompressed without decompressing all attribute information for a point cloud or a point. For example, a point may include velocity attribute information and color attribute information. The velocity attribute information may be decoded without decoding the color attribute information and vice versa. In some embodiments, an application utilizing the compressed attribute information may indicate what attributes are to be decompressed for a point cloud.

At block 1422, it is determined if there are additional points to evaluate. If so, the process reverts to block 1414 and a next point to evaluate is selected. If there are not additional points to evaluate, at block 1424, decompressed attribute information is provided, for example as a decompressed sub-point cloud, wherein each point comprises spatial information and one or more attributes.

Example Applications Using Point Cloud Encoders and Decoders

Figure 15:
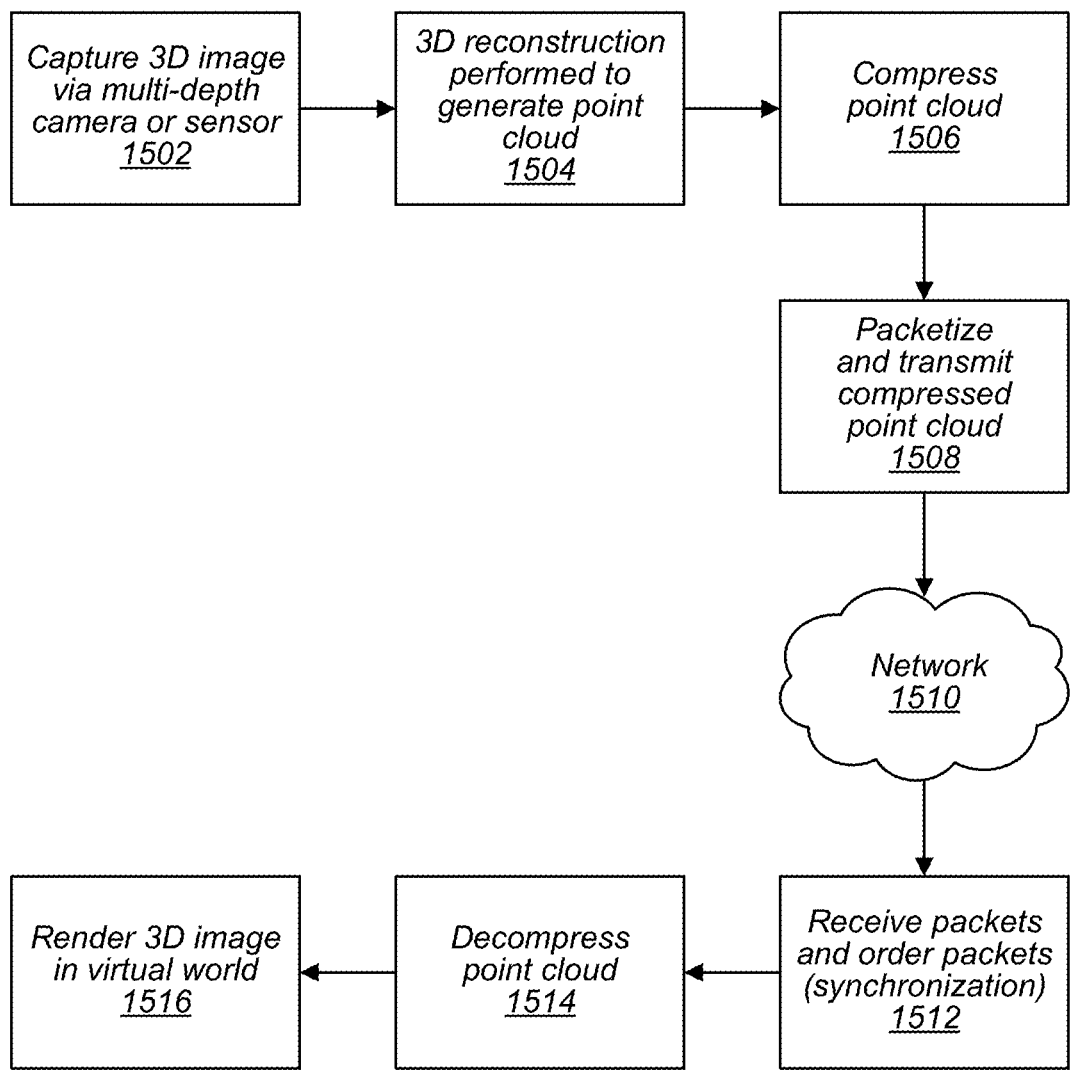
FIG. 15 illustrates compressed point cloud information being used in a 3-D application, according to some embodiments.

FIG. 15 illustrates compressed point clouds being used in an application representing a 3-D environment, according to some embodiments. In some embodiments, a sensor, an encoder, and decoder may be used to communicate point clouds in a 3-D application. For example, at block 1502, a sensor may capture a 3D image and at block 1504, the sensor or a processor associated with the sensor may perform a 3D reconstruction based on sensed data to generate a point cloud or mesh.

At block 1506, an encoder may compress the point cloud and at block 1508 the encoder or a post processor may packetize and transmit the compressed point cloud, via a network 1510. At block 1512, the packets may be received at a destination location that includes a decoder. The decoder may decompress the point cloud or mesh at 1514 and the decompressed point cloud or mesh may be rendered at block 1516. In some embodiments a 3-D application may transmit point cloud data or mesh in real time such that a display at block 1516 represents images being observed at block 1502. For example, a camera in a canyon may allow a remote user to experience walking through a virtual canyon at block 1516.

Figure 16:
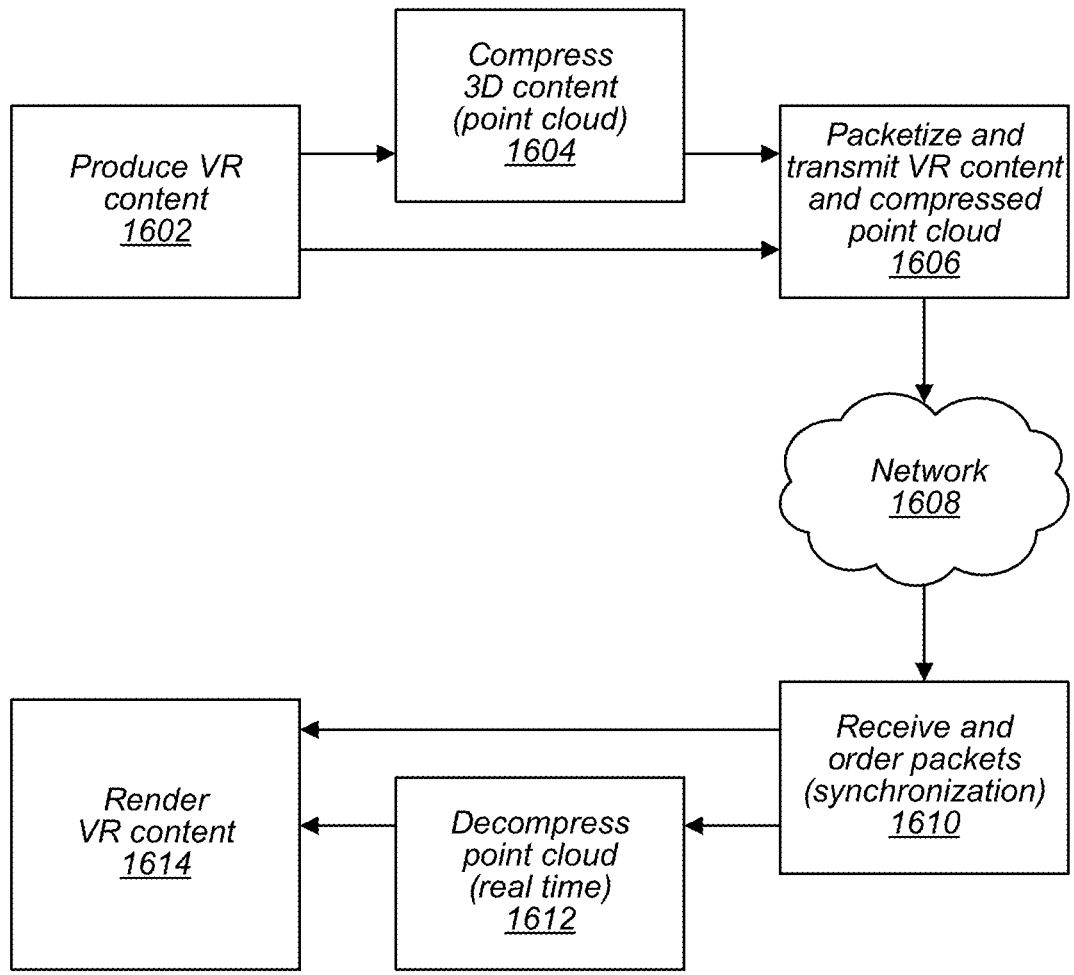
FIG. 16 illustrates compressed point cloud information being used in a virtual reality application, according to some embodiments.

FIG. 16 illustrates compressed point clouds or meshes being used in a virtual reality (VR) or augmented reality (AR) application, according to some embodiments. In some embodiments, point clouds or meshes may be generated in software (for example as opposed to being captured by a sensor). For example, at block 1602, virtual reality or augmented reality content is produced. The virtual reality or augmented reality content may include point cloud data and non-point cloud data and/. For example, a non-point cloud character may traverse a landscape represented by point clouds or meshes, as one example. At block 1604, the point cloud data or mesh may be compressed and at block 1606 the compressed point cloud data or compressed mesh data and non-point cloud data may be packetized and transmitted via a network 1608. For example, the virtual reality or augmented reality content produced at block 1602 may be produced at a remote server and communicated to a VR or AR content consumer via network 1608. At block 1610, the packets may be received and synchronized at the VR or AR consumer's device. A decoder operating at the VR or AR consumer's device may decompress the compressed point cloud or mesh at block 1612 and the point cloud or mesh and non-point cloud data may be rendered in real time, for example in a head mounted display of the VR or AR consumer's device. In some embodiments, point cloud data or mesh data may be generated, compressed, decompressed, and rendered responsive to the VR or AR consumer manipulating the head mounted display to look in different directions.

In some embodiments, point cloud or mesh compression as described herein may be used in various other applications, such as geographic information systems, sports replay broadcasting, museum displays, autonomous navigation, etc.

Example Computer System

Figure 17:
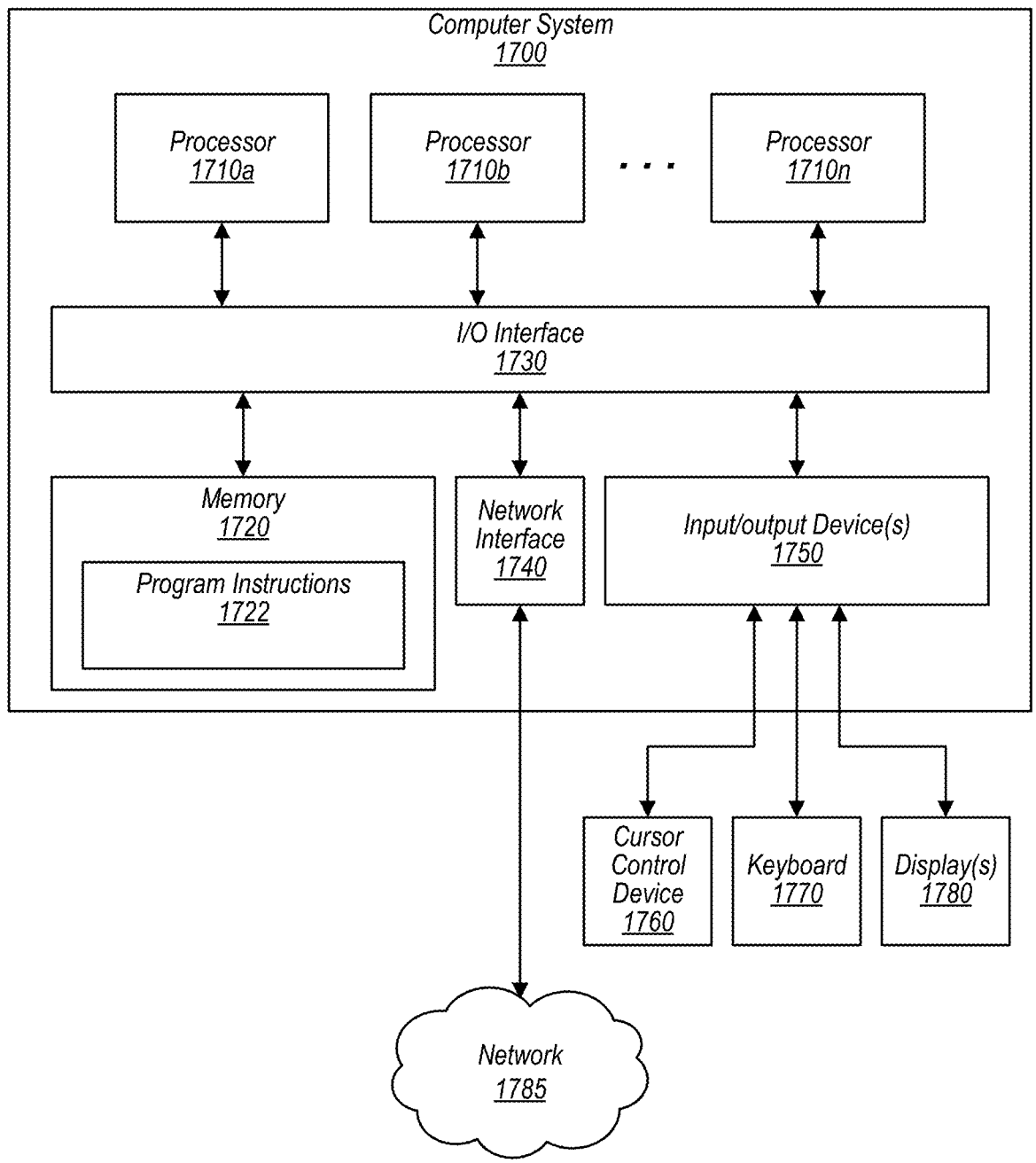
FIG. 17 illustrates an example computer system that may implement an encoder or decoder, according to some embodiments.

FIG. 17 illustrates an example computer system 1700 that may implement an encoder or decoder or any other ones of the components described herein, (e.g., any of the components described above with reference to FIGS. 1-16), in accordance with some embodiments. The computer system 1700 may be configured to execute any or all of the embodiments described above. In different embodiments, computer system 1700 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a point cloud encoder or decoder, as described herein may be executed in one or more computer systems 1700, which may interact with various other devices. Note that any component, action, or functionality described above with respect to FIGS. 1-16 may be implemented on one or more computers configured as computer system 1700 of FIG. 17, according to various embodiments. In the illustrated embodiment, computer system 1700 includes one or more processors 1710 coupled to a system memory 1720 via an input/output (I/O) interface 1730. Computer system 1700 further includes a network interface 1740 coupled to I/O interface 1730, and one or more input/output devices 1750, such as cursor control device 1760, keyboard 1770, and display(s) 1780. In some cases, it is contemplated that embodiments may be implemented using a single instance of computer system 1700, while in other embodiments multiple such systems, or multiple nodes making up computer system 1700, may be configured to host different portions or instances of embodiments. For example, in one embodiment some elements may be implemented via one or more nodes of computer system 1700 that are distinct from those nodes implementing other elements.

In various embodiments, computer system 1700 may be a uniprocessor system including one processor 1710, or a multiprocessor system including several processors 1710 (e.g., two, four, eight, or another suitable number). Processors 1710 may be any suitable processor capable of executing instructions. For example, in various embodiments processors 1710 may be general-purpose or embedded processors implementing any of a variety of instruction set architectures (ISAs), such as the x86, PowerPC, SPARC, or MIPS ISAs, or any other suitable ISA. In multiprocessor systems, each of processors 1710 may commonly, but not necessarily, implement the same ISA.

System memory 1720 may be configured to store point cloud compression or point cloud decompression program instructions 1722 and/or sensor data accessible by processor 1710. In various embodiments, system memory 1720 may be implemented using any suitable memory technology, such as static random access memory (SRAM), synchronous dynamic RAM (SDRAM), nonvolatile/Flash-type memory, or any other type of memory. In the illustrated embodiment, program instructions 1722 may be configured to implement an image sensor control application incorporating any of the functionality described above. In some embodiments, program instructions and/or data may be received, sent or stored upon different types of computer-accessible media or on similar media separate from system memory 1720 or computer system 1700. While computer system 1700 is described as implementing the functionality of functional blocks of previous Figures, any of the functionality described herein may be implemented via such a computer system.

In one embodiment, I/O interface 1730 may be configured to coordinate I/O traffic between processor 1710, system memory 1720, and any peripheral devices in the device, including network interface 1740 or other peripheral interfaces, such as input/output devices 1750. In some embodiments, I/O interface 1730 may perform any necessary protocol, timing or other data transformations to convert data signals from one component (e.g., system memory 1720) into a format suitable for use by another component (e.g., processor 1710). In some embodiments, I/O interface 1730 may include support for devices attached through various types of peripheral buses, such as a variant of the Peripheral Component Interconnect (PCI) bus standard or the Universal Serial Bus (USB) standard, for example. In some embodiments, the function of I/O interface 1730 may be split into two or more separate components, such as a north bridge and a south bridge, for example. Also, in some embodiments some or all of the functionality of I/O interface 1730, such as an interface to system memory 1720, may be incorporated directly into processor 1710.

Network interface 1740 may be configured to allow data to be exchanged between computer system 1700 and other devices attached to a network 1785 (e.g., carrier or agent devices) or between nodes of computer system 1700. Network 1785 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1750 may, in some embodiments, include one or more display terminals, keyboards, keypads, touchpads, scanning devices, voice or optical recognition devices, or any other devices suitable for entering or accessing data by one or more computer systems 1700. Multiple input/output devices 1750 may be present in computer system 1700 or may be distributed on various nodes of computer system 1700. In some embodiments, similar input/output devices may be separate from computer system 1700 and may interact with one or more nodes of computer system 1700 through a wired or wireless connection, such as over network interface 1740.

As shown in FIG. 17, memory 1720 may include program instructions 1722, which may be processor-executable to implement any element or action described above. In one embodiment, the program instructions may implement the methods described above. In other embodiments, different elements and data may be included. Note that data may include any data or information described above.

Those skilled in the art will appreciate that computer system 1700 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1700 may be transmitted to computer system 1700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow

What is claimed is:

1. A computer-readable medium storing program instructions, that when executed on or across one or more processors, cause the one or more processors to:
receive information for a three-dimensional volumetric content representing an object or scene, wherein the three-dimensional volumetric content comprises a plurality of points, and wherein respective ones of the points comprise spatial information and attribute information for the point;
segment the three-dimensional volumetric content into a plurality of portions comprising sub-sets of the plurality of points, wherein respective ones of the plurality of portions comprise points visible from respective viewing areas of the three-dimensional volumetric content; encode the plurality of portions; and provide, in response to a request for one or more viewing areas for the three-dimensional volumetric content, one or more of the encoded plurality of portions which correspond to the one or more requested viewing areas, wherein the one or more encoded portions for the requested one or more viewing areas are provided in a bit stream without including other ones of the plurality of portions corresponding to other viewing areas of the three-dimensional volumetric content that were not requested.

2. The computer-readable medium of claim 1, wherein the program instructions, when executed on or across the one or more processors, cause the one or more processors to:

receive an additional request for one or more additional viewing areas of the three-dimensional content; and provide, in response to the additional request, one or more additional ones of the encoded portions corresponding to the requested one or more additional viewing areas.

3. The computer-readable medium of claim 1, wherein respective ones of the viewing areas at least partially overlap one another such that at least some points of the three-dimensional volumetric content included in a portion corresponding to a given viewing area are also included in another portion corresponding to another viewing area.

4. The computer-readable medium of claim 1, wherein at least some of the viewing areas cover a same or overlapping portions of the three-dimensional volumetric content, but extend out to different distances from the three-dimensional volumetric content.

5. The computer-readable medium of claim 4, wherein to encode the portions of the three-dimensional volumetric content, the program instructions, when executed on or across the one or more processors, cause the one or more processors to:

encode a first portion corresponding to a first viewing area of the three-dimensional volumetric content covering a first portion of the three-dimensional volumetric content and at a first viewport distance from the three-dimensional volumetric content using a first encoding resolution comprising a first quantity of points of the three-dimensional volumetric content; and encode a second sub-point cloud corresponding to a second viewing area of the three-dimensional volumetric content covering the first portion and at a second viewport distance from the three-dimensional volumetric content using a second encoding resolution comprising a second quantity of points of the three-dimensional volumetric content, wherein the first encoding resolution and the second encoding resolution are different.

6. The computer-readable medium of claim 1, wherein to encode the portions of the three-dimensional volumetric content the program instructions, when executed on or across the one or more processors, cause the one or more processors to:

for each respective portion being encoded:

generate a plurality of patch images for patches of the portion of the three-dimensional volumetric content projected onto a patch plane, wherein the plurality of patch images comprise attribute patch images or geometry patch images for a corresponding portion of the portion of the three-dimensional content;

pack the generated patch images into two-dimensional image frames; and video encode the two-dimensional image frames comprising the packed patch images, wherein separate sets of encoded two-dimensional image frames are generated for respective ones of the respective portions of the three-dimensional volumetric content corresponding to different ones of the viewing areas.

7. The computer-readable medium of claim 1, wherein to encode the sub-point clouds the program instructions, when executed on or across the one or more processors, cause the one or more processors to:

for each respective portion of the three-dimensional volumetric content being encoded:

encode a geometrical representation of the portion of the three-dimensional volumetric content using an octree, minimum spanning tree, mesh, or other geometrical compression method; and encode attribute values for the portion of the three-dimensional volumetric content using a region adaptive hierarchical transform (RAHT), an interpolation based prediction transform, or other attribute value compression method, wherein separate bit streams are generated for respective encoded ones of the respective portions of the three-dimensional volumetric content, wherein each of the separate bit streams comprises an encoded geometrical representation for the respective portion of the three-dimensional volumetric content and/or encoded attribute values for the respective portion of the three-dimensional volumetric content.

8. A system, comprising:

one or more computing devices configured to:

receive information for three-dimensional volumetric content representing an object or scene, wherein the three-dimensional volumetric content comprises a plurality of points, and wherein respective ones of the points comprise spatial information and attribute information for the point;

segment the three-dimensional volumetric content into a plurality of portions comprising sub-sets of the plurality of points of the three-dimensional volumetric content, wherein respective ones of the portions comprise points of the three-dimensional volumetric content included in respective viewing areas for the three-dimensional volumetric content;

encode the portions of the three-dimensional volumetric content;

receive a request from a requester for one or more viewing areas of the three-dimensional volumetric content; and provide one or more of the encoded portions corresponding to the one or more requested viewing areas wherein the one or more encoded portions corresponding to the one or more requested viewing areas are provided without including other ones of the plurality of portions corresponding to other viewing areas of the three-dimensional volumetric content that were not requested.

9. The system of 8, wherein the one or more computing devices implement a streaming service and wherein the requester is a client of the streaming service.

10. The system of claim 8, wherein respective ones of the viewing areas at least partially overlap such that at least some points of the three-dimensional volumetric content included in a first portion corresponding to a first one of the viewing areas are also included in a second portion corresponding to another one of the viewing areas.

11. The system of claim 8, wherein the one or more computing devices are further configured to:
receive information indicating one or more parameters defining or modifying the respective viewing areas;
generate or modify definitions for the respective viewing areas based on the one or more parameters; and
segment or re-segment the three-dimensional volumetric content based on the generated or modified viewing area definitions, wherein respective ones of the portions or updated versions of the respective ones of the portions comprise points of the three-dimensional volumetric content visible from the respective defined or modified viewing areas.

12. The system of claim 11, wherein the one or more parameters to be applied to define or modify the respective viewing areas comprise:
a number of viewing areas for the three-dimensional volumetric content;
a size of one or more of the viewing areas;
a set of viewport angles corresponding to one or more of the viewing areas; or
a shape of one or more of the viewing areas.

13. The system of claim 8, wherein, for respective ones of the portions of the three-dimensional volumetric content being encoded, the one or more computing devices are configured to:
generate a plurality of patch images for patches of the portion of the three-dimensional volumetric content projected onto a patch plane, wherein the plurality of patch images comprise attribute patch images or geometry patch images for a corresponding portion of the portion of the three-dimensional volumetric content;
pack the generated patch images into two-dimensional image frames; and
video encode the two-dimensional image frames comprising the packed patch images.

14. The system of claim 8, wherein for respective ones of the portions of the three-dimensional volumetric content being encoded the one or more computing devices are configured to:
encode a geometrical representation of the portion of the three-dimensional volumetric content using an octree, minimum spanning tree, mesh, or other geometrical compression method; and
encode attribute values for the portion of the three-dimensional volumetric content using a region adaptive hierarchical transform (RAHT), an interpolation based prediction transform, or other attribute value compression method.

15. A computer-readable medium storing program instructions, that when executed on or across one or more processors, cause the one or more processors to:
obtain metadata indicating a plurality of viewing areas for viewing three-dimensional volumetric content via a viewport;
determine, based on a user input, one or more viewing areas for which the three-dimensional volumetric content is to be presented;
request the one or more viewing areas of the three-dimensional volumetric content;
receive one or more encoded portions of the three-dimensional volumetric content corresponding to the one or more requested viewing areas;
reconstruct portions of the three-dimensional volumetric content corresponding to the one or more viewing areas using the received one or more encoded portions; and
present, via a display, the reconstructed portions.

16. The computer-readable medium of claim 15, wherein the program instructions when executed on or across one or more processors, cause the one or more processors to:
provide, to a system hosting the three-dimensional volumetric content, information indicating one or more parameters to be applied to define or modify the viewing areas for viewing the three-dimensional volumetric content.

17. The computer-readable medium of claim 16, wherein the one or more parameters to be applied to define or modify the views comprise:
a number of viewing areas for the three-dimensional volumetric content;
a size of one or more of the viewing areas;
a set of viewport angles corresponding to one or more of the viewing areas; or
a shape of one or more of the viewing areas.

18. The computer-readable medium of claim 15, wherein the three-dimensional volumetric content is dynamic content, and wherein the received one or more encoded portions comprise encoded portions for the three-dimensional volumetric content at multiple moments in time, wherein the program instructions, further cause the one more processors to:
reconstruct portions of the three-dimensional volumetric content at respective ones of the moments of time corresponding to the one or more viewing areas from which the three-dimensional volumetric content is being viewed, wherein the one or more portions of the three-dimensional volumetric content are reconstructed using the received one or more encoded portions.

19. A device, comprising:
a memory storing program instructions; and
one or more processors, wherein the program instructions, when executed by the one or more processors, cause the one or more processors to:
receive or access metadata indicating a plurality of viewing areas for viewing three-dimensional volumetric content via a viewport;
determine, based on a user input, one or more viewing areas from which the three-dimensional volumetric content is to be viewed;
request the one or more viewing areas of the three-dimensional volumetric content;
receive one or more encoded portions of the three-dimensional volumetric content corresponding to the one or more requested viewing areas; and
reconstruct portions of the three-dimensional volumetric content corresponding to the one or more viewing areas using the received one or more encoded portions.

20. The device of claim 19, further comprising:
a user interface configured to indicate a view from which a viewport of the device is viewing the three-dimensional volumetric content;
wherein the one or more viewing areas from which the three-dimensional volumetric content is being viewed are determined based on the user input from the user interface.

* * * * *